US012565379B2

(12) United States Patent
    Fagerland

(10) Patent No.: US 12,565,379 B2
(45) Date of Patent: Mar. 3, 2026

(54) STORAGE SYSTEM

(71) Applicant: Autostore Technology AS, Nedre Vats (NO)

(72) Inventor: Ingvar Fagerland, Kolnes (NO)

(73) Assignee: AutoStore Technology AS, Nedre Vats (NO)

( * ) Notice: Subject to any disclaimer, the term of this patent is extended or adjusted under 35 U.S.C. 154(b) by 811 days.

(21) Appl. No.: 17/596,367

(22) PCT Filed: May 7, 2020

(86) PCT No.: PCT/EP2020/062726
    § 371 (c)(1),
    (2) Date: Dec. 8, 2021

(87) PCT Pub. No.: WO2020/249331
    PCT Pub. Date: Dec. 17, 2020

(65) Prior Publication Data
    US 2022/0267094 A1      Aug. 25, 2022

(30) Foreign Application Priority Data

Jun. 11, 2019    (NO) .................................... 20190710

(51) Int. Cl.
    B65G 1/06        (2006.01)
    B65G 1/04        (2006.01)
    B65G 1/137       (2006.01)
(52) U.S. Cl.
    CPC .........  B65G 1/1375 (2013.01); B65G 1/0464
        (2013.01); B65G 1/0478 (2013.01); B65G
                                            1/065 (2013.01)
(58) Field of Classification Search
    CPC .. B65G 1/1375; B65G 1/0464; B65G 1/0478;
            B65G 1/065; B65G 1/0485; B65G 35/00;
                (Continued)

(56) References Cited

U.S. PATENT DOCUMENTS 11,220,400 B2 *   1/2022  Lisso ................... B65G 1/0414
2011/0295413 A1   12/2011  Hara et al.
                    (Continued)

FOREIGN PATENT DOCUMENTS

CN        105947514 A       9/2016
CN        108349653 A       7/2018
            (Continued)

OTHER PUBLICATIONS

Kazuyuki Tanji, Notice of Reasons for Rejection for Japanese Patent Application No. 2021-573189, mailed Jun. 5, 2024, Japanese Patent Office, 6 pages (with translation).
                    (Continued)

*Primary Examiner* — Patrick H Mackey
(74) *Attorney, Agent, or Firm* — Baker Botts L.L.P.

(57)                ABSTRACT

A storage system includes at least one consolidation vehicle, a transfer rail grid, an item picking area, and an item delivery station. The consolidation vehicle includes a wheel arrangement for moving the consolidation vehicle in two perpendicular directions upon the transfer rail grid. The consolidation vehicle may be positioned upon the item picking area to receive multiple items picked from at least one storage container, and an item picker is arranged to pick items from the storage container and transfer them to the consolidation vehicle. The consolidation vehicle may be positioned upon the item delivery station to deliver items received from the storage container to a packaging/processing assembly. The consolidation vehicle includes an item carrier arranged such that items may be emptied from the item carrier when the consolidation vehicle is positioned at the item delivery station.

17 Claims, 15 Drawing Sheets

(58) Field of Classification Search

CPC .......... B65G 1/04; B65G 1/06; B65D 25/005; B65D 25/38; B65D 85/00; B61B 13/02; G06K 7/10336

See application file for complete search history.

(56) References Cited

U.S. PATENT DOCUMENTS

| | | | |
|---|---|---|---|
| 2014/0054361 A1 | 2/2014 | Derby et al. | |
| 2014/0277693 A1 | 9/2014 | Naylor | |
| 2018/0086573 A1 | 3/2018 | Lindbo | |
| 2018/0346243 A1* | 12/2018 | Lindbo .................. | B65G 1/065 |
| 2019/0168964 A1* | 6/2019 | Lert, Jr. ................. | B65G 1/065 |
| 2022/0371825 A1* | 11/2022 | Gravelle .............. | G05D 1/0291 |
| 2023/0028034 A1* | 1/2023 | Gravelle .............. | B65G 1/0485 |
| 2023/0271785 A1* | 8/2023 | Gravelle .............. | B65G 1/1378 |
| 2023/0356387 A1* | 11/2023 | Kalouche .............. | B25J 19/021 |
| 2023/0415993 A1* | 12/2023 | Heggebø .............. | B65G 1/0464 |

FOREIGN PATENT DOCUMENTS

| | | | |
|---|---|---|---|
| CN | 106005866 B | 8/2018 | |
| CN | 108430890 A | 8/2018 | |
| CN | 113195380 A | 7/2021 | |
| GB | 2547805 A | 8/2017 | |
| JP | 2004-060955 A | 2/2004 | |
| JP | 2018516825 A | 6/2018 | |
| JP | 2018533535 A | 11/2018 | |
| NO | 317366 B1 | 10/2004 | |
| TW | 201813900 A | 4/2018 | |
| WO | 2014/075937 A1 | 5/2014 | |
| WO | 2014/090684 A1 | 6/2014 | |
| WO | 2014/195901 A1 | 12/2014 | |
| WO | 2014/203126 A1 | 12/2014 | |
| WO | 2015/140216 A1 | 9/2015 | |
| WO | 2015/193278 A1 | 12/2015 | |
| WO | 2016/022546 A1 | 2/2016 | |
| WO | 2016/120075 A1 | 8/2016 | |
| WO | 2016/198467 A1 | 12/2016 | |
| WO | 2017-081281 A1 | 5/2017 | |
| WO | 2017/097724 A1 | 6/2017 | |
| WO | 2018/069282 A1 | 4/2018 | |
| WO | 2018/146304 A1 | 8/2018 | |
| WO | 2018233886 A1 | 12/2018 | |
| WO | WO-2019238641 A1 * | 12/2019 | ............ B65G 65/23 |
| WO | 2020/126725 A1 | 6/2020 | |

OTHER PUBLICATIONS

International Search Report for corresponding International Application No. PCT/EP2020/062726, mailed Nov. 20, 2020 (7 pages).

Written Opinion for corresponding International Application No. PCT/EP2020/062726, mailed Nov. 20, 2020 (13 pages).

Norwegian Search Report in counterpart Norwegian U.S. Appl. No. 20/190,710 issued Sep. 11, 2019 (2 pages).

Office Action issued in counterpart Chinese Patent Application No. 202080043125.6 mailed on Jan. 3, 2023 (19 pages).

Thenert, Alexander, Office Action for European Patent Application No. EP20724814.7, dated Jan. 20, 2025, 6 pages, pub. by the EPO, Rijswijk Netherlands.

Liu Xuejun, "Notice of Submission of an Opinion" for Korean Patent Application No. KR10-2022-7000475, dated Apr. 8, 2025, 13 pages, pub. by KIPO, Seo-gu, Daejeon, Korea.

Thenert, Alexander, Extended European Search Report for European Patent Application No. EP24219362.1, dated Jul. 1, 2025, 15 pages, pub. by European Patent Office, Rijswijk Netherlands.

Morgan, David, Office Action in CA3142592, mailed Nov. 5, 2025, 6 pages, Canadian Intellectual Property Office, Canada.

* cited by examiner

A

B

16

STORAGE SYSTEM

FIELD OF INVENTION

The present invention relates to an automated storage and retrieval system and a method for use of an automated storage and retrieval system.

BACKGROUND

FIGS. 1A and 2B disclose a typical prior art automated storage and retrieval system 1 with a framework structure 100. FIGS. 1B and 2B disclose prior art container handling vehicles 200,300 operating in the system 1 disclosed in FIGS. 1A and 2A, respectively.

The framework structure 100 defines a storage grid 104 comprising a plurality of upright members 102 and optionally a plurality of horizontal members 103 supporting the upright members 102. The members 102, 103 may typically be made of metal, e.g. extruded aluminium profiles.

The storage grid 104 comprises multiple grid columns 112. A large majority of the grid columns are also termed storage columns 105, in which storage containers 106, also known as bins, are stacked one on top of another to form stacks 107.

Each storage container 106 may typically hold a plurality of product items (not shown), and the product items within a storage container 106 may be identical or may be of different product types depending on the application.

The storage grid 104 guards against horizontal movement of the of storage containers 106 in the stacks 107, and guides vertical movement of the containers 106, but does normally not otherwise support the storage containers 106 when stacked.

The automated storage and retrieval system 1 comprises a rail system 108 (or a top rail grid) arranged in a grid pattern across the top of the storage grid 104, on which rail system 108 a plurality of container handling vehicles 200,300 (as exemplified in FIGS. 1B and 2B) are operated to raise storage containers 106 from, and lower storage containers 106 into, the storage columns 105, and also to transport the storage containers 106 above the storage columns 105. The horizontal extent of one of the grid cells 122 constituting the grid pattern is in FIGS. 1A and 2A marked by thick lines.

Each grid cell 122 has a width which is typically within the interval of 30 to 150 cm, and a length which is typically within the interval of 50 to 200 cm. Each grid opening 115 has a width and a length which is typically 2 to 10 cm less than the width and the length of the grid cell 122 due to the horizontal extent of the rails 110,111.

The rail system 108, also termed a top rail grid, comprises a first set of parallel rails 110 arranged to guide movement of the container handling vehicles 200,300 in a first direction X across the top of the frame structure 100, and a second set of parallel rails 111 arranged perpendicular to the first set of rails 110 to guide movement of the container handling vehicles 200,300 in a second direction Y which is perpendicular to the first direction X. In this way, the rail system 108 defines the upper ends of the grid columns 112 above which the container handling vehicles 200,300 can move laterally, i.e. in a plane which is parallel to the horizontal X-Y plane. Commonly, at least one of the sets of rails 110,111 is made up of dual-track rails allowing two container handling vehicles to pass each other on neighbouring grid cells 122. Dual-track rails are well-known and disclosed in for instance WO 2015/193278 A1 and WO 2015/140216 A1, the contents of which are incorporated herein by reference.

A schematic view of a grid cell 122 as defined when both sets of rails in the rail system are dual track rails is shown in FIG. 3. On such a rail system, a container handling vehicle 200, having a maximum periphery fitting within the lateral area defined by the grid cell 122, is allowed to travel along a row of grid columns even if another container handling vehicle 200 is positioned above a grid column neighboring that row. Each grid cell 122 comprises a grid opening 115 being delimited by a pair of rails 110a,110b of the first set of parallel rails 110 and a pair of rails 111a, 111b of the second set of parallel rails 111. In FIG. 3, the grid cell 122 is indicated by a dashed box.

Consequently, rails 110a and 110b form pairs of neighboring rails defining parallel rows of grid cells running in the X direction, and rails 111a and 111b form pairs of neighboring rails defining parallel rows of grid cells running in the Y direction.

Each prior art container handling vehicle 200,300 comprises a vehicle body and a wheel arrangement of eight wheels, wherein a first set of four wheels 32a enable the lateral movement of the container handling vehicles 200,300 in the X direction and a second set of four wheels 32b enable the lateral movement in the Y direction. One or both sets of wheels in the wheel arrangement can be lifted and lowered, so that the first set of wheels and/or the second set of wheels can be engaged with the respective set of rails 110, 111 at any one time.

Each prior art container handling vehicle 200,300 also comprises a lifting device 34 (only shown in FIG. 2B) for vertical transportation of storage containers 106, e.g. raising a storage container 106 from, and lowering a storage container 106 into, a grid column 112. The lifting device 34 comprises four metal lifting bands 31 extending in a vertical direction and connected close to the corners of a lifting frame 33 (may also be termed a gripping device) such that the lifting frame is kept horizontal. The lifting frame 33 features container connecting elements 35 for releasable connection to a storage container 106, and guiding pins 30.

Conventionally, and also for the purpose of this application, Z=1 identifies the uppermost layer of the grid 104, i.e. the layer immediately below the rail system 108, Z=2 the second layer below the rail system 108, Z=3 the third layer etc. In the prior art storage grid disclosed in FIGS. 1A and 2A, Z=8 identifies the lowermost, bottom layer of the grid 104. Consequently, as an example, and using the Cartesian coordinate system X, Y, Z indicated in FIGS. 1A and 2B, the storage container identified as 106' in FIG. 1 can be said to occupy grid location or cell X=10, Y=2, Z=3. The container handling vehicles 200,300 can be said to travel in layer Z=0 and each grid column can be identified by its X and Y coordinates.

Each container handling vehicle 200 comprises a storage compartment or space (not shown) for receiving and stowing a storage container 106 when transporting the storage container 106 across the top of the storage grid 104. The storage space may comprise a cavity arranged centrally within the vehicle body, e.g. as is described in WO2014/090684A1, the contents of which are incorporated herein by reference.

Alternatively, the container handling vehicles 300 may have a cantilever construction as described in NO317366, the contents of which are also incorporated herein by reference.

The container handling vehicles 200 may have a footprint, i.e. an extent in the X and Y directions, which is generally equal to the horizontal area of a grid cell 122, i.e. the extent of a grid cell 122 in the X and Y directions, e.g. as is described in WO2015/193278A1, the contents of which are incorporated herein by reference.

Alternatively, the container handling vehicles 200 may have a footprint which is larger than the horizontal area of a grid cell 122, e.g. as is disclosed in WO2014/090684A1.

In a storage grid 104, a majority of the grid columns 112 are storage columns 105, i.e. grid columns where storage containers 106 are stored in stacks 107. However, a grid 104 normally has at least one grid column 112 which is not used for storing storage containers 106, but is arranged at a location wherein the container handling vehicles 200,300 can drop off and/or pick up storage containers 106 so that they can be transported to a second location (not shown) where the storage containers 106 can be accessed from outside of the grid 104 or transferred out of or into the grid 104. Within the art, such a location is normally referred to as a "port" and the grid column at which the port is located may be referred to as a transfer column 119,120. The drop-off and pick-up ports are the upper ends/openings of a respective transfer column 119,120.

The prior art storage grids 104 in FIGS. 1A and 2A comprise two transfer columns 119 and 120. The first transfer column 119 may for example comprise a dedicated drop-off port where the container handling vehicles 200,300 can drop off storage containers 106 to be transported through the transfer column 119 and further to e.g. a picking/stocking station, and the second transfer column 120 may comprise a dedicated pick-up port where the container handling vehicles 200,300 can pick up storage containers 106 that have been transported through the transfer column 120 from e.g. a picking/stocking station. A storage container may be transported through a transfer column by use of the lifting device of a container handling vehicle 200,300 or by use of a storage container lift arranged in the transfer column. Each of the ports of the first and second transfer column may be suitable for both pick-up and drop-off of storage containers.

The second location may typically be a picking/stocking station, wherein product items are removed from and/or positioned into the storage containers 106. In a picking/stocking station, the storage containers 106 are normally never removed from the automated storage and retrieval system 1 but are returned into the storage grid 104 once accessed.

For monitoring and controlling the automated storage and retrieval system 1, e.g. monitoring and controlling the location of respective storage containers 106 within the storage grid 104; the content of each storage container 106; and the movement of the container handling vehicles 200,300 so that a desired storage container 106 can be delivered to the desired location at the desired time without the container handling vehicles 200,300 colliding with each other, the automated storage and retrieval system 1 comprises a computerized control system (not shown) which typically comprises a database for keeping track of the storage containers 106.

A conveyor system comprising conveyor belts or rollers is commonly employed to transport the storage containers from a lower end of the transfer columns 119,120 to e.g. a picking/stocking station.

A conveyor system may also be arranged to transfer storage containers between different storage grids, e.g. as is described in WO2014/075937A1, the contents of which are incorporated herein by reference.

Further, WO2016/198467A1, the contents of which are incorporated herein by reference, discloses an example of a prior art access system having conveyor belts (FIGS. 5a and 5b in WO2016/198467A1) and a frame mounted rail (FIGS. 6a and 6b in WO2016/198467A1) for transporting storage containers between transfer columns and stations where operators can access the storage containers.

When a storage container 106 stored in the storage grid 104 disclosed in FIG. 1A is to be accessed, one of the container handling vehicles 200,300 is instructed to retrieve the target storage container 106 from its position in the grid 104 and transport it to or through the transfer column 119. This operation involves moving the container handling vehicle 200,300 to a grid location above the storage column 105 in which the target storage container 106 is positioned, retrieving the storage container 106 from the storage column 105 using the container handling vehicle's lifting device (not shown), and transporting the storage container 106 to the transfer column 119. If the target storage container 106 is located deep within a stack 107, i.e. with one or a plurality of other storage containers positioned above the target storage container 106, the operation also involves temporarily moving the above-positioned storage containers prior to lifting the target storage container 106 from the storage column 105. This step, which is sometimes referred to as "digging" within the art, may be performed with the same container handling vehicle 200,300 that is subsequently used for transporting the target storage container 106 to the transfer column, or with one or a plurality of other cooperating container handling vehicles 200,300. Alternatively, or in addition, the automated storage and retrieval system 1 may have container handling vehicles 200,300 specifically dedicated to the task of temporarily removing storage containers 106 from a storage column 105. Once the target storage container 106 has been removed from the storage column 105, the temporarily removed storage containers can be repositioned into the original storage column 105. However, the removed storage containers may alternatively be relocated to other storage columns 105.

When a storage container 106 is to be stored in the grid 104, one of the container handling vehicles 200,300 is instructed to pick up the storage container 106 from the transfer column 120 and to transport it to a grid location above the storage column 105 where it is to be stored. After any storage containers positioned at or above the target position within the storage column stack 107 have been removed, the container handling vehicle 200,300 positions the storage container 106 at the desired position. The removed storage containers may then be lowered back into the storage column 105 or relocated to other storage columns 105.

A common operation performed in the prior art storage systems is the consolidation of multiple different items picked from the storage grid, e.g. consolidate multiple items belonging to a single customer order. The multiple items are consolidated for further processing, such as packaging in a single package for shipment to a customer.

In the prior art systems, the consolidation of multiple items is performed by first transferring the storage container (s) containing the items in an order from the storage grid to a manual picking/stocking station. At the picking/stocking station, an operator picks the required items of an order and places them in a single package for further processing, e.g. shipment to a customer. Different items to be consolidated are normally stored in different storage containers and the speed of the consolidation process is thus restricted by the speed at which the different storage containers are made available at the picking/stocking station. Further, due to the sequential access to the different storage containers, identical orders having the same items from the same storage containers are not processed significantly faster than non-identical orders since the storage containers must be circulated between the picking/stocking station and the storage grid for each order.

The efficiency of the prior art consolidation process is not optimal for several other reasons. Both the picking/stocking station and the area required for the consolidation of the items must be arranged adjacent to each other, such that the operator may easily transfer the items between the picking/supply station and the package in which the items are consolidated. The prior art picking stations are arranged at the periphery of the storage grid, and the positioning of both the picking/supply station and the area required for the consolidation of the items, e.g. a conveyor belt for transport of the packages for the consolidated items, are set. The set positioning may be a disadvantage when the storage system must be adapted to a given building layout. Alternatively, an area required for the consolidation of the items, e.g. a conveyor belt for transport of the packages for the consolidated item may be arranged at a separate location, but this would significantly lower the efficiency of the consolidation process.

In view of the above, the aim of the present invention is to provide a storage system, and a method for operating such a system, that solves or at least mitigates one or more of the aforementioned problems related to the use of prior art storage systems.

An objective of the present invention is to provide a storage system which is more effective than prior art systems in the consolidation of items to be picked from the storage system.

Another objective is to provide a more flexible storage system.

SUMMARY OF THE INVENTION

The present invention is defined by the appended claims and in the following:

In a first aspect, the present invention provides a storage system comprising a storage grid structure, in which storage containers are stored, and multiple container handling vehicles, the storage grid structure comprises vertical column profiles interconnected at their upper ends by top rails forming a horizontal top rail grid upon which the container handling vehicles may move in two perpendicular directions, the container handling vehicles are able to retrieve storage containers from, and store storage containers in, the storage grid structure, and transport the storage containers on the top rail grid, wherein the storage system comprises at least one consolidation vehicle, a transfer rail grid, an item picking area and an item delivery station, wherein the consolidation vehicle comprises a wheel arrangement for moving the consolidation vehicle in two perpendicular directions upon the transfer rail grid;

the transfer rail grid comprises transfer rails upon which the consolidation vehicle may move in two perpendicular horizontal directions;

the item picking area comprises a first section of the transfer rail grid, upon which the consolidation vehicle may be positioned to receive multiple items picked from at least one storage container, and an item picker arranged to pick the items from the storage container and transfer them to the consolidation vehicle;

the item delivery station comprises a second section of the transfer rail grid, upon which the consolidation vehicle may be positioned to deliver items received from the storage container to a packaging/processing assembly; and the consolidation vehicle comprises an item carrier arranged such that the items may be emptied from the item carrier when the consolidation vehicle is positioned at the item delivery station.

In other words, the item carrier is arranged such that the items may be emptied from the item carrier without any external devices, such as operators or robotic arms, when the consolidation vehicle is positioned at the item delivery station. In other words, the consolidation vehicle comprises an item carrier arranged such that the consolidation vehicle may empty items from the item carrier when the consolidation vehicle is positioned at the item delivery station. Alternatively, the item carrier may be defined as comprising an item transfer assembly arranged to move items accommodated by the item carrier in a lateral or downwards direction such that the items may be emptied from the item carrier when the consolidation vehicle is positioned at the item delivery station.

In an embodiment of the storage system, the consolidation vehicle may be positioned upon the first section to receive multiple items picked from multiple storage containers.

In an embodiment of the storage system, the item carrier has an open top and comprises an openable section arranged such that items may be emptied from the item carrier when the openable section is open.

In an embodiment of the storage system, the openable section may be connected to at least one actuator arranged to move the section between an open and a closed position. In the closed position the items may not be emptied out of the item carrier. In other words, the openable section is arranged such that items accommodated in the item carrier may be emptied out of the item carrier when the openable section is in an open position.

In an embodiment of the storage system, the item carrier is an integral part of the consolidation vehicle.

In an embodiment of the storage system, the item carrier is arranged to support a packaging box into which items may be received at the item picking area.

The item carrier may comprise a space in which items may be arranged.

In an embodiment, the storage system comprises multiple consolidation vehicles.

In an embodiment, the storage system comprises at least a first consolidation vehicle and a second consolidation vehicle.

In an embodiment, the storage system may comprise multiple item picking areas.

In an embodiment, the storage system may comprise at least a first and a second item picking area. The first and second item picking area may comprise separate sections of the transfer rail grid.

In an embodiment, the storage system may comprise a first and a second storage grid structure. The transfer rail grid may be arranged such that the consolidation vehicle may be positioned at a picking area to receive items picked from a storage container arranged in or retrieved from any of the first and second storage grid structures.

In an embodiment, the storage system may comprise a first item picking area upon which a consolidation vehicle may retrieve items picked from a storage container arranged in or retrieved from a first storage grid, and a second item picking area upon which a consolidation vehicle may retrieve items picked from a storage container arranged in or retrieved from a second storage grid In an embodiment, the storage system may comprise multiple item delivery stations.

In an embodiment of the storage system, the top rail grid is separate from the transfer rail grid. In other words, the top rail grid and the transfer rail grid are separate such that the container handling vehicles are prevented from entering the transfer rail grid and the consolidation vehicles, and optionally container transfer vehicles (see below), are prevented from entering the top rail grid. The top rail grid and the transfer rail grid may be separate by being arranged at different levels or separate in the horizontal plane by having blocking elements, e.g. a fence, arranged between the two grids or by being arranged at a distance from each other.

In an embodiment of the storage system, the transfer rail grid is arranged at a lower level than the level of the top rail grid.

In an embodiment of the storage system, the transfer rail grid is arranged at a level below the level of the top rail grid.

In an embodiment of the storage system, the item carrier comprises a peripheral sidewall and a bottom section, and the openable section comprises a section of the peripheral sidewall or the bottom section. The peripheral sidewall and the bottom section defines a space in which items may be arranged.

In an embodiment of the storage system, items accommodated in the item carrier may be emptied from the item carrier in a lateral or downwards direction, when the consolidation vehicle is positioned at the item delivery station.

In an embodiment of the storage system, the wheel arrangement may comprise a first and a second set of wheels, and one or both sets of wheels may be connected to a wheel lifting mechanism and may be lifted and lowered, so that the first set of wheels and/or the second set of wheels can be engaged with the respective set of transfer rails of the transfer rail grid at any one time. The wheel arrangement is motorized, such that the consolidation vehicle may be driven in two perpendicular directions upon the transfer rail grid.

In an embodiment of the storage system, the item picker comprises a robotic arm. In other words, the item picker may be a robotic picking arm.

The robotic picking arm may be moveable in a horizontal direction at a level above the level of the transfer rail grid, such that a consolidation vehicle may be positioned below the robotic picking arm. The robotic picking arm may be moveable along a horizontal beam. The beam may be supported by columns such that at least a part of the beam is arranged above the transfer rail grid to allow access for consolidation vehicles below the beam and the robotic picking arm. The robotic picking arm may be arranged such that the at least one item may be picked from any of multiple storage containers. Each of the multiple storage containers may be arranged at an upper level of a corresponding storage column or accommodated in a container transfer vehicle arranged at the first section of the transfer grid.

In an embodiment of the storage system, the consolidation vehicle comprises an actuator connected to the openable section of the peripheral sidewall or the bottom section, the actuator being arranged to move the section of the sidewall or the bottom section, respectively, between an open and closed position.

In an embodiment of the storage system, items accommodated in an item carrier of a consolidation vehicle may be emptied out of the item carrier when the consolidation vehicle is positioned at the item delivery station and the openable section of the sidewall or bottom section is in the open position.

In an embodiment of the storage system, the openable section of the peripheral sidewall or the bottom section comprises a hinged surface.

In an embodiment of the storage system, the consolidation vehicle comprises an openable section of the peripheral sidewall and a conveyor belt at a bottom section of the item carrier. The peripheral sidewall extends above the upper level of the conveyor belt. The peripheral sidewall prevents items arranged in the item carrier from exiting the item carrier until the openable section of the peripheral sidewall is open.

In an embodiment of the storage system, the openable section of the sidewall is hinged at an upper section of the item carrier such that a lower end of the openable section is raised when in the open position.

In an embodiment of the storage system, the item delivery station comprises an opening or a conveyor arranged to guide items emptied from the consolidation vehicle to the packaging/processing assembly.

The conveyor may be any suitable type of conveyor, for instance a roller or belt conveyor. In an embodiment, the conveyor is a belt conveyor to accommodate any size of items suitable for storage in a storage container. The belt conveyor may be arranged to guide and transport items in a lateral direction.

The opening may be arranged at a level below the second section of the transfer rail grid, preferably directly below a grid cell of the second section of the transfer rail. The opening may be arranged above a packaging/processing assembly, such as a conveyor featuring packaging boxes or containers, into which items from at least one consolidation vehicle may be guided, or above a suitable conveyor for guiding items to a packaging/processing assembly.

In an embodiment of a storage system, the transfer rails are dual-track rails, such that two consolidation vehicles may pass each other upon adjacent grid cells of the transfer rail grid.

In an embodiment of a storage system, the consolidation vehicle has a horizontal periphery, i.e. a maximum horizontal periphery, fitting within the horizontal area defined by a grid cell of the transfer rail grid.

In an embodiment of the storage system, the vertical column profiles define multiple storage columns, in which storage containers are stored one on top of another in vertical stacks, and the container handling vehicles are able to retrieve storage containers from, and store storage containers in, the storage columns.

In an embodiment of the storage system, the vertical column profiles define at least one transfer column through which a container handling vehicle may transfer a storage container between the top rail grid and a lower level of the storage grid structure.

In an embodiment, the storage system comprises at least one container transfer vehicle having a storage container carrier and a wheel arrangement arranged to move the container transfer vehicle in two perpendicular directions upon the transfer rail grid, and the transfer rail grid comprises a third section arranged below a transfer column of the storage grid, such that a container handling vehicle may raise or lower a storage container between the storage container carrier and the top rail grid. The wheel arrangement may comprise eight wheels, wherein a first set of four wheels enable the lateral movement of the container transfer vehicle in a first direction and a second set of the remaining four wheels enable the lateral movement in a second direction being perpendicular to the first direction. One or both sets of wheels in the wheel arrangement may be connected to a wheel lifting mechanism and may be lifted and lowered, so that the first set of wheels and/or the second set of wheels can be engaged with the respective set of transfer rails of the transfer rail grid at any one time.

In an embodiment of the storage system, the wheel arrangement of the consolidation vehicle is identical to the wheel arrangement of the container transfer vehicle.

In an embodiment of the storage system, the container transfer vehicle has a horizontal periphery, i.e. a maximum horizontal periphery, fitting within the horizontal area defined by a grid cell of the transfer rail grid.

In an embodiment of the storage system, the consolidation vehicle may comprise a weighing mechanism to measure the weight of items accommodated by the item carrier. The measured weight may be used to optimize the consolidation process.

In a second aspect, the present invention provides a consolidation vehicle for a storage system according to the first aspect. The consolidation vehicle comprises a wheel arrangement and an item carrier, wherein the wheel arrangement is for moving the consolidation vehicle in two perpendicular directions upon the transfer rail grid; and the item carrier comprises a peripheral sidewall, a bottom section and an open top, wherein a section of the peripheral sidewall is openable, such that an item may be emptied from the item carrier in a lateral direction.

In an embodiment the item carrier may be box-shaped.

In an embodiment of the consolidation vehicle, the wheel arrangement comprises eight wheels, wherein a first set of four wheels enable the lateral movement of the consolidation vehicle in a first direction and a second set of the remaining four wheels enable the lateral movement in a second direction being perpendicular to the first direction. One or both sets of wheels in the wheel arrangement may be connected to a wheel lifting mechanism and may be lifted and lowered, so that the first set of wheels and/or the second set of wheels can be engaged with the respective set of transfer rails of the transfer rail grid at any one time.

In an embodiment, the consolidation vehicle comprises at least one actuator connected to the openable section of the peripheral sidewall, wherein the actuator is arranged to move the openable section between an open and closed position.

In an embodiment of the consolidation vehicle, the openable section comprises at least one pivotable surface connected to the actuator. The pivotable surface may be hinged or pivotable connected at an upper section of the item carrier.

In an embodiment of the consolidation vehicle, the peripheral sidewall comprises four sidewall sections, a bottom section and an open top, wherein one of the sidewall sections is openable, such that an item may be emptied from the item carrier in a lateral direction.

In an embodiment, the consolidation vehicle comprises a laterally moveable surface, arranged to move items accommodated in the item carrier in a lateral direction towards the openable section of the peripheral sidewall, and/or an inclinable surface arranged such that items may slide out of the container carrier when the surface is inclined. The laterally moveable surface may be a vertical surface arranged to push items out of the container carrier or a horizontal surface of an endless belt upon which the items may be arranged. The inclinable surface may be a surface of the bottom section which may be inclined by use of an actuator, either by inclining the item carrier or by inclining the surface independent of the remaining parts of the item carrier.

In an embodiment of the consolidation vehicle, the laterally moveable surface is a conveyor belt arranged at the bottom section of the item carrier. The conveyor belt may be arranged to move an item accommodated in the item carrier in a lateral direction out of the item carrier, i.e. such that the item is emptied out of the item carrier in a lateral direction. The conveyor belt may be a part of the bottom section.

The first aspect of the invention may comprise any of the features of the embodiments of the second aspect.

In a third aspect, the present invention provides a method of consolidating multiple items in a storage system, the storage system comprising a storage grid structure, in which storage containers are stored, and multiple container handling vehicles, the storage grid structure comprises vertical column profiles interconnected at their upper ends by top rails forming a horizontal top rail grid upon which the container handling vehicles may move in two perpendicular directions, the container handling vehicles are able to retrieve storage containers from, and store storage containers in, the storage grid structure, and transport the storage containers on the top rail grid, wherein the storage system comprises at least one consolidation vehicle, a transfer rail grid, an item picking area and an item delivery station, wherein the consolidation vehicle comprises a wheel arrangement for moving the consolidation vehicle in two perpendicular directions upon the transfer rail grid;

the transfer rail grid comprises transfer rails upon which the consolidation vehicle may move in two perpendicular horizontal directions;

the item picking area comprises a first section of the transfer rail grid, upon which the consolidation vehicle may be positioned to receive multiple items picked from at least one storage container, and an item picker arranged to pick the items from the storage container and transfer them to the consolidation vehicle;

the item delivery station comprises a second section of the transfer rail grid, upon which the consolidation vehicle may be positioned to deliver items received from the storage container to a packaging/processing assembly; and the consolidation vehicle comprises an item carrier having an open top and comprising an openable section arranged such that the items may be emptied from the item carrier when the consolidation vehicle is positioned at the item delivery station; and the method comprises the steps of:

positioning a consolidation vehicle at the first section of the transfer rail grid;

transferring a first item from a first storage container to the item carrier of the consolidation vehicle by use of the picking device;

transferring a second item from the first storage container, or from a second storage container, to the item carrier of the consolidation vehicle by use of the picking device;

moving the consolidation vehicle to the second section of the transfer rail grid; and opening the openable section, such that the first and second items are emptied from the item carrier in a lateral or downwards direction.

In an embodiment of the method of consolidating multiple items in a storage system, the first and second items are emptied from the item carrier in a lateral or downwards direction onto a conveying arrangement.

In an embodiment of the method of consolidating multiple items in a storage system, the first and second items are emptied from the item carrier in a downwards direction through an opening arranged below a grid cell of the transfer grid.

In an embodiment of the method of consolidating multiple items in a storage system, the first and second items are emptied from the item carrier in a lateral direction onto a conveyor belt.

In an embodiment, the method of consolidating multiple items in a storage system comprises a step of conveying the first and second items from the item delivery station to a packaging/processing assembly.

In an embodiment of the method of consolidating multiple items in a storage system, the first storage container is arranged on a first container transfer vehicle moveable upon the transfer rail grid. The first container transfer vehicle carrying the first storage container may be arranged adjacent to the consolidation vehicle in a step preceding the step of transferring the first item from the first storage container to the item carrier of the consolidation vehicle by use of the picking device.

In an embodiment of the method of consolidating multiple items in a storage system, the second storage container is arranged on a second container transfer vehicle moveable upon the transfer rail grid. The second container transfer vehicle may be arranged adjacent to the consolidation vehicle in a step preceding the step of transferring the second item from the second storage container to the item carrier of the consolidation vehicle by use of the picking device.

In an embodiment of the method of consolidating multiple items in a storage system, the consolidation vehicle and the container transfer vehicles have a horizontal periphery, i.e. a maximum horizontal periphery, fitting within the horizontal area defined by a grid cell of the transfer rail grid.

In an embodiment of the method of consolidating multiple items in a storage system, the vertical column profiles define multiple storage columns, in which the storage containers are stored one on top of another in vertical stacks, and the container handling vehicles are able to retrieve storage containers from, and store storage containers in, the storage columns.

In an embodiment of the method of consolidating multiple items in a storage system, the vertical column profiles define at least one transfer column through which a container handling vehicle may transfer a storage container between the top rail grid and a lower level of the storage grid structure.

In an embodiment of the method of consolidating multiple items in a storage system, the first storage container is arranged on a first container transfer vehicle by positioning the first container transfer vehicle on a section of the transfer rail grid below the at least one transfer column, and the first storage container is transferred from the top rail grid to a container carrier of the first container transfer vehicle by a container handling vehicle.

In an embodiment of the method of consolidating multiple items in a storage system, the second storage container is arranged on a second container transfer vehicle by positioning the second container transfer vehicle on a section of the transfer rail grid below the at least one transfer column, and the second storage container is transferred from the top rail grid to a container carrier of the second container transfer vehicle by a container handling vehicle.

The third aspect of the invention may comprise any of the features of the embodiments of the first and second aspect.

In a fourth aspect, the present invention provides a method of consolidating multiple items in a storage system, the storage system comprising a storage grid structure, in which storage containers are stored, and multiple container handling vehicles, the storage grid structure comprises vertical column profiles interconnected at their upper ends by top rails forming a horizontal top rail grid upon which the container handling vehicles may move in two perpendicular directions, the container handling vehicles are able to retrieve storage containers from, and store storage containers in, the storage grid structure, and transport the storage containers on the top rail grid, wherein the storage system comprises a first consolidation vehicle, a second consolidation vehicle, a transfer rail grid, a first item picking area, a second item picking area and an item delivery station, wherein the transfer rail grid comprises transfer rails upon which the consolidation vehicles may move in two perpendicular horizontal directions;

each item picking area comprises a section of the transfer rail grid, upon which the consolidation vehicles may be positioned to receive at least one item picked from at least one storage container, and an item picker arranged to pick the item from the storage container and transfer it to any of the first and second consolidation vehicles;

the item delivery station comprises a section of the transfer rail grid, upon which the consolidation vehicles may be positioned to deliver the at least one item received at the first or second item picking area to a packaging/processing assembly; and each consolidation vehicle comprises an item carrier having an open top and comprising an openable section arranged such that the item may be emptied from the item carrier when the consolidation vehicle is positioned at the item delivery station; and the method comprises the steps of:

positioning the first consolidation vehicle at the first item picking area;

transferring a first item from a storage container to the item carrier of the first consolidation vehicle by use of the picking device;

positioning the second consolidation vehicle at the second item picking area;

transferring a second item from a storage container to the item carrier of the second consolidation vehicle by use of the picking device;

moving the first and the second consolidation vehicles to the item delivery station; and opening the openable sections of the first and second consolidation vehicles, such that the first and second items are emptied from the respective item carriers in a lateral or downwards direction and consolidated at the packaging/processing assembly.

In an embodiment of the fourth aspect, the step of moving the first and second consolidation vehicles to the item delivery station and the step of opening the openable sections comprises the sequential steps of:

moving the first consolidation vehicle to the item delivery station;

opening the openable section of the first consolidation vehicle such that the first item is emptied from the item carrier in a lateral or downwards direction;

moving the second consolidation vehicle to the item delivery station;

opening the openable section of the second consolidation vehicle such that the second item is emptied from the item carrier in a lateral or downwards direction and consolidated with the first item at the packaging/processing assembly.

In an embodiment of the fourth aspect, the first and the second items are emptied from the respective item carrier in a lateral or downwards direction onto a conveying arrangement.

In an embodiment of the fourth aspect, the first and second items are emptied from the respective item carrier in a downwards direction through an opening arranged below a grid cell of the transfer grid.

In an embodiment of the fourth aspect, the first and second items are emptied from the item carrier in a lateral direction onto a conveyor belt.

In an embodiment, the fourth aspect comprises a step of conveying the first and second items from the item delivery station to a packaging/processing assembly.

In an embodiment of the fourth aspect, the first item is transferred at the first item picking station from a first storage container arranged on a first container transfer vehicle moveable upon the transfer rail grid. The first container transfer vehicle carrying the first storage container may be arranged adjacent to the first consolidation vehicle in a step preceding the step of transferring the first item from the first storage container to the item carrier of the first consolidation vehicle by use of the picking device.

In an embodiment of the fourth aspect, the second item is transferred at the second item picking station from a second storage container arranged on a second container transfer vehicle moveable upon the transfer rail grid. The second container transfer vehicle may be arranged adjacent to the second consolidation vehicle in a step preceding the step of transferring the second item from the second storage container to the item carrier of the second consolidation vehicle by use of the picking device.

In an embodiment of the fourth aspect, the consolidation vehicles and the container transfer vehicles have a horizontal periphery, i.e. a maximum horizontal periphery, fitting within the horizontal area defined by a grid cell of the transfer rail grid.

In an embodiment of the fourth aspect, the vertical column profiles define multiple storage columns, in which the storage containers are stored one on top of another in vertical stacks, and the container handling vehicles are able to retrieve storage containers from, and store storage containers in, the storage columns.

In an embodiment of the fourth aspect, the vertical column profiles define at least one transfer column through which a container handling vehicle may transfer a storage container between the top rail grid and a lower level of the storage grid structure.

In an embodiment of the fourth aspect, the first storage container is arranged on a first container transfer vehicle by positioning the first container transfer vehicle on a section of the transfer rail grid below the at least one transfer column, and the first storage container is transferred from the top rail grid to a container carrier of the first container transfer vehicle by a container handling vehicle.

In an embodiment of the fourth aspect, the second storage container is arranged on a second container transfer vehicle by positioning the second container transfer vehicle on a section of the transfer rail grid below the at least one transfer column, and the second storage container is transferred from the top rail grid to a container carrier of the second container transfer vehicle by a container handling vehicle.

In an embodiment of the fourth aspect, the storage system comprises a first storage grid structure and a second storage grid structure, and the first item is transferred from a storage container of the first storage grid structure and the second item is transferred from a storage container of the second storage grid structure.

In a fifth aspect, the present invention provides a method of consolidating multiple items in a storage system, the storage system comprising a storage grid structure, in which storage containers are stored, and multiple container handling vehicles, the storage grid structure comprises vertical column profiles interconnected at their upper ends by top rails forming a horizontal top rail grid upon which the container handling vehicles may move in two perpendicular directions, the container handling vehicles are able to retrieve storage containers from, and store storage containers in, the storage grid structure, and transport the storage containers on the top rail grid, wherein the storage system comprises at least one consolidation vehicle, a transfer rail grid, an item picking area and an item delivery station, wherein the transfer rail grid comprises transfer rails upon which the consolidation vehicle may move in two perpendicular horizontal directions;

the item picking area comprises a first section of the transfer rail grid, upon which the consolidation vehicle may be positioned to receive multiple items picked from at least one storage container, and an item picker arranged to pick the items from the storage container and transfer them to the consolidation vehicle;

the item delivery station comprises a second section of the transfer rail grid, upon which the consolidation vehicle may be positioned to deliver items received from the storage container to a packaging/processing assembly; and the consolidation vehicle comprises an item carrier featuring a conveyor upon which an open top packaging box may be arranged such that the box (and items) may be emptied from the item carrier when the consolidation vehicle is positioned at the item delivery station; and the method comprises the steps of:

positioning a consolidation vehicle at the first section of the transfer rail grid;

transferring a first item from a first storage container to a packaging box arranged on the item carrier of the consolidation vehicle by use of the picking device;

transferring a second item from the first storage container, or from a second storage container, to the packaging box on the consolidation vehicle by use of the picking device;

moving the consolidation vehicle to the second section of the transfer rail grid; and actuating the conveyor of the consolidation vehicle, such that the packaging box (and the first and second items) is emptied (or transferred) from the item carrier in a lateral direction.

In an embodiment of the fifth aspect, the packaging box (and the first and second items) is emptied (or transferred) from the item carrier in a lateral direction onto a conveying arrangement.

The term "emptied from" may alternatively be replaced by the term "transferred from" since the terms are considered to be interchangeable.

SHORT DESCRIPTION OF THE DRAWINGS

The present invention is described in detail below by way of example only and with reference to the following drawings:

FIGS. 1 and 2 are perspective views of a prior art automated storage and retrieval system, wherein FIG. 1A and FIG. 2A show the complete system and FIG. 1B and FIG. 2B show examples of prior art container handling vehicles suitable for use in the system.

DETAILED DESCRIPTION OF THE INVENTION

Figure 1:
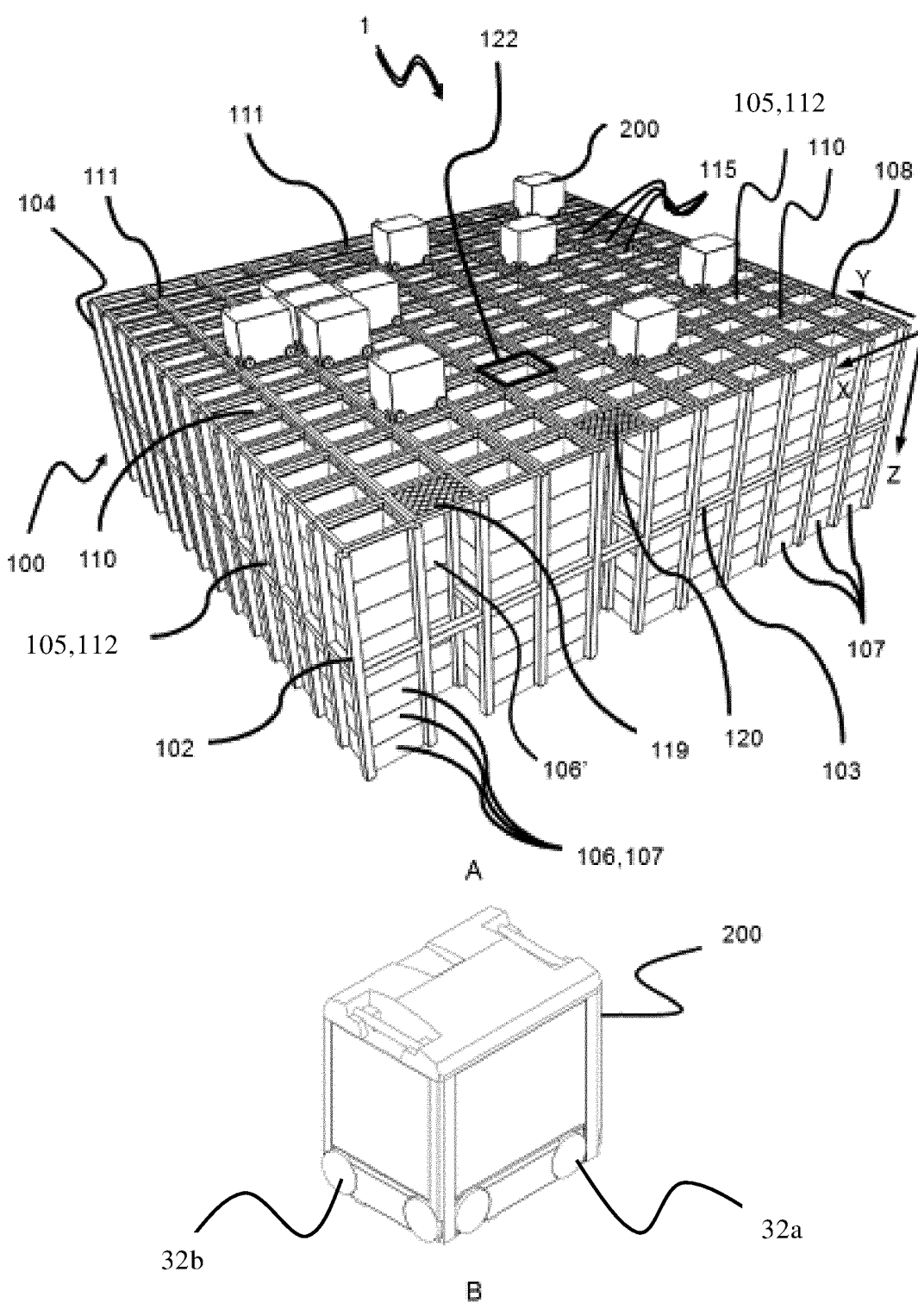
Figure 2:
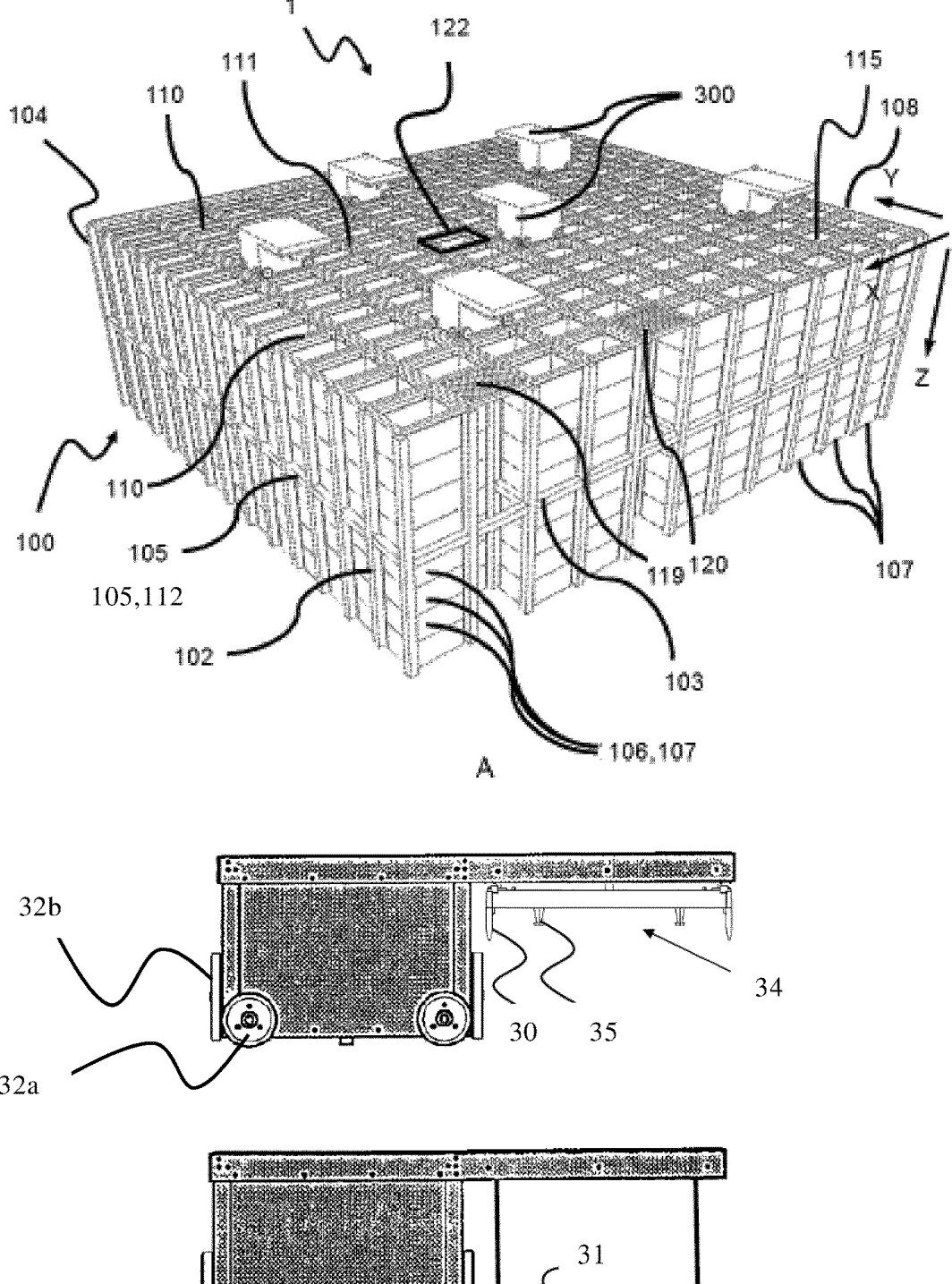
Figure 3:
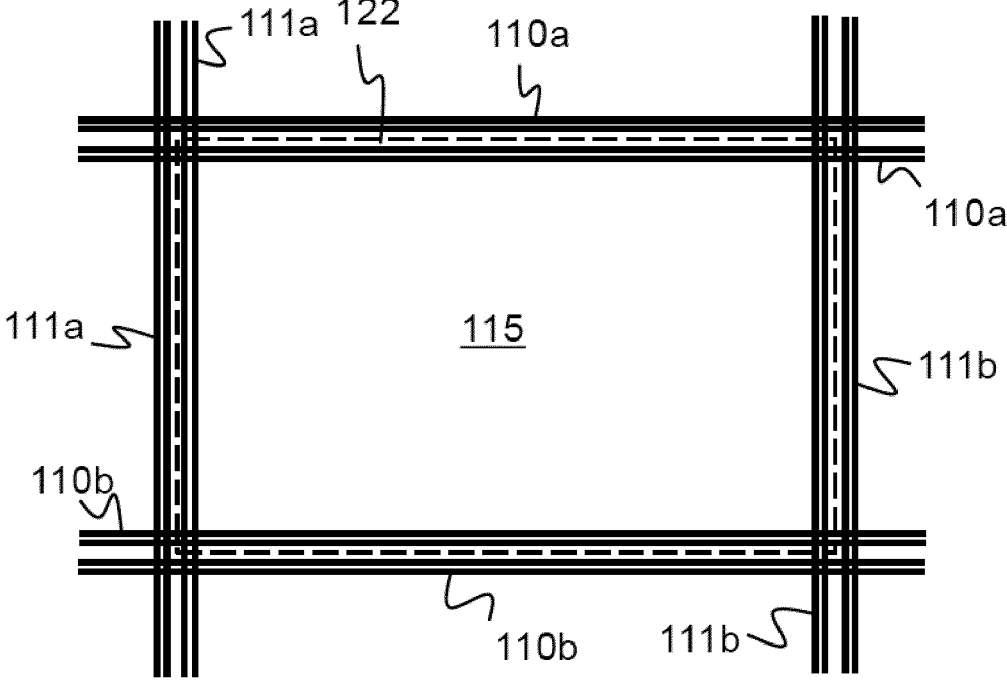
FIG. 3 is a schematic top view of a grid cell defined by dual-track rails.
Figure 4:
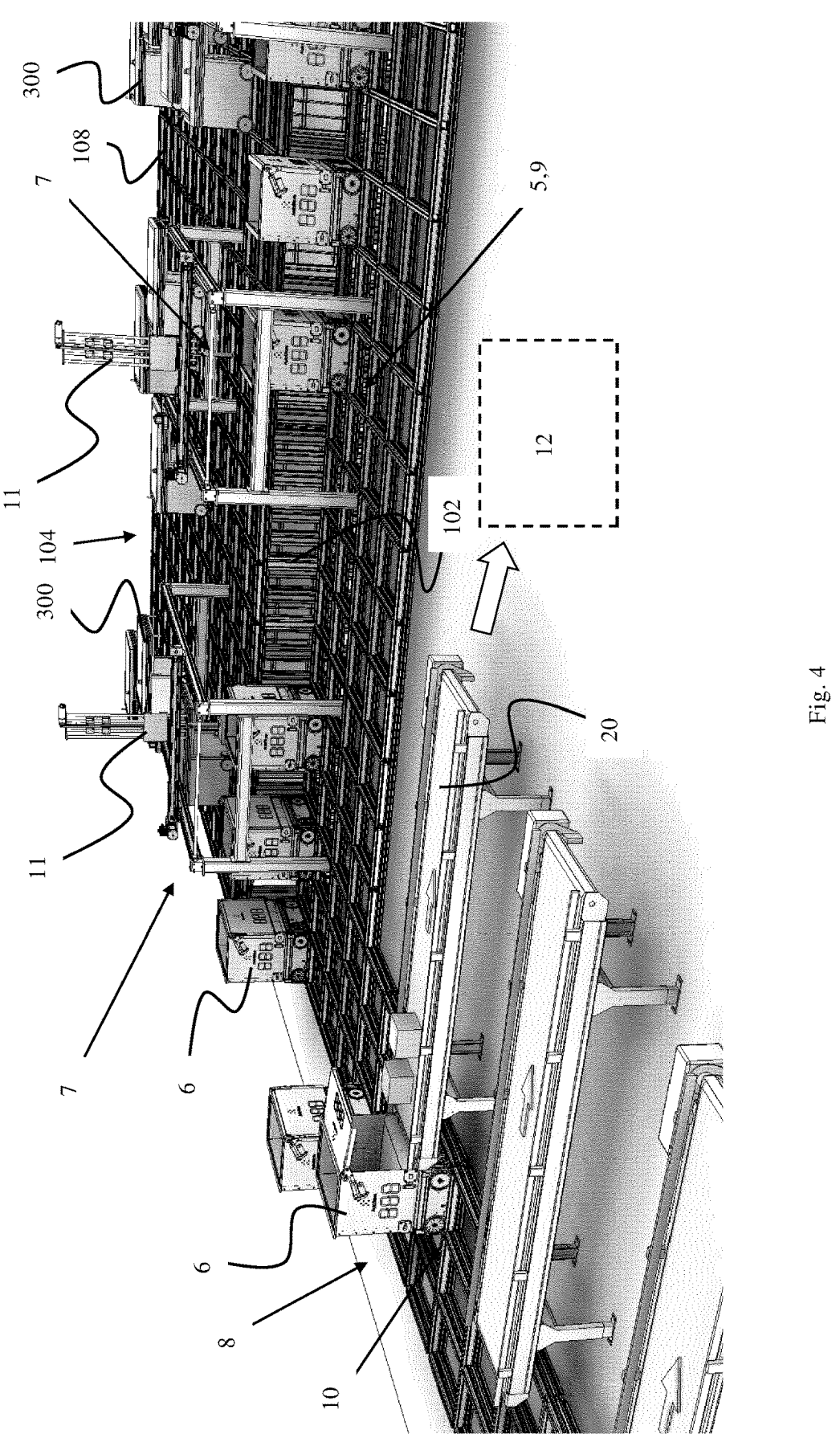
FIG. 4 is a perspective view of a first exemplary storage system according to the invention.
Figure 5:
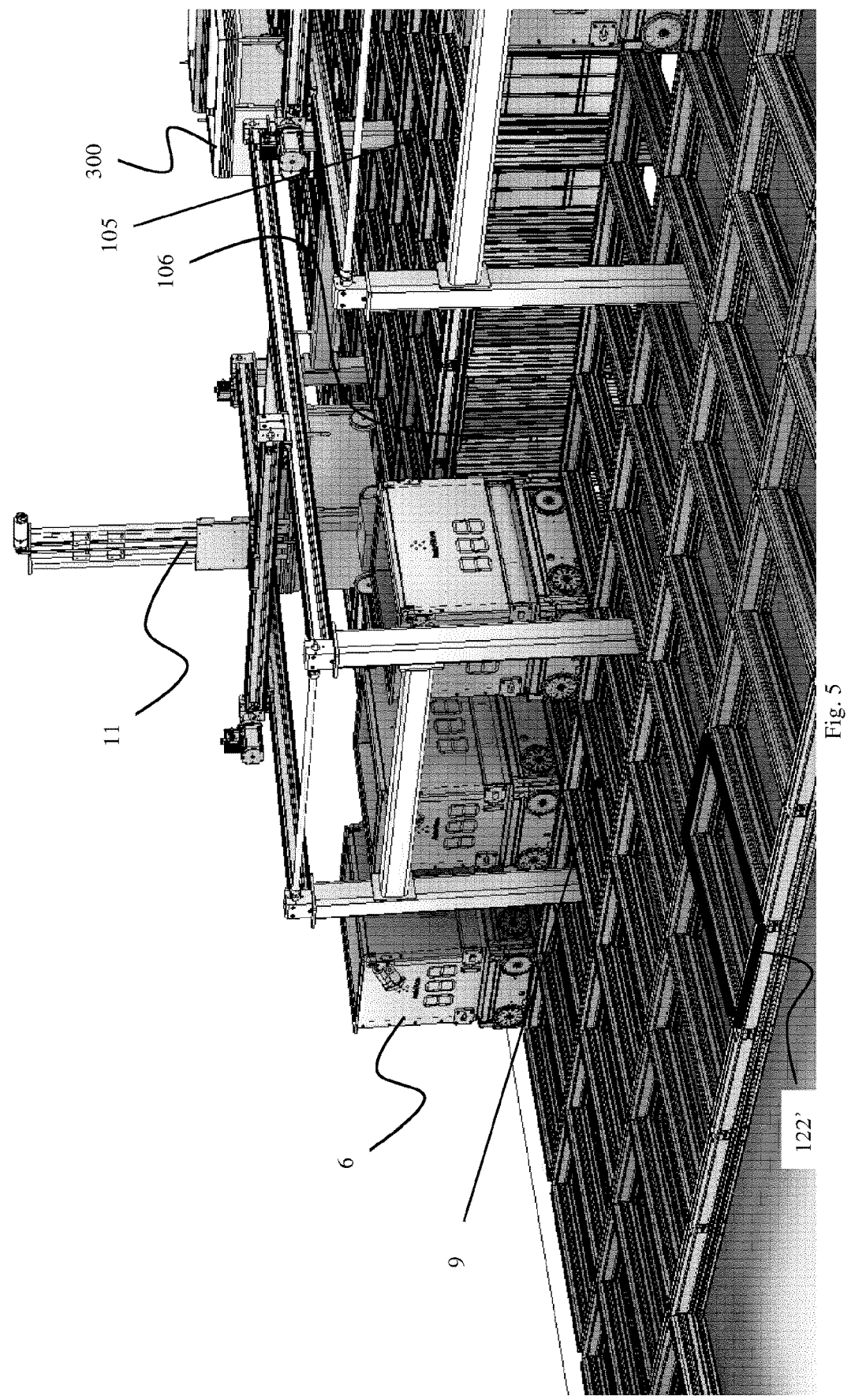
FIG. 5 is a perspective view of a picking station of the storage system in FIG. 3.

In the following, embodiments of the invention will be discussed in more detail with reference to the appended drawings. It should be understood, however, that the drawings are not intended to limit the invention to the subject-matter depicted in the drawings. Furthermore, even if some of the features are described in relation to the system only, it is apparent that they are valid for the related methods as well, and vice versa.

The present invention is aimed at providing a storage system having an improved and efficient consolidation of picked items.

A first exemplary embodiment of a storage system according to the invention is shown in FIGS. 4 to 7. The storage system features a storage grid structure 104 upon which multiple container handling vehicles 300 are arranged.

The storage grid structure comprises vertical column profiles 102 defining multiple storage columns 105, in which storage containers 106 are stored one on top of another in vertical stacks 107. The storage grid will also feature at least one transfer column (see FIG. 12 for an exemplary transfer column) arranged to allow transfer of storage containers out of and into the storage grid.

The column profiles 102 are interconnected at their upper ends by top rails 110,111 forming a horizontal top rail grid 108 upon which the container handling vehicles 300 may move in two perpendicular directions, the container handling vehicles are able to retrieve storage containers 106 from, and store storage containers in, the storage columns 105 and transport the storage containers upon the storage grid structure 104.

To obtain an efficient consolidation of items picked from the storage containers, the storage system features multiple consolidation vehicles 6, a transfer rail grid 5, an item picking area 7 and an item delivery station 8.

The transfer rail grid 5 is made up of transfer rails 110',111' upon which the consolidation vehicles 6 may move in two perpendicular horizontal directions.

The item picking area 7 comprises a first section 9 of the transfer rail grid, upon which the consolidation vehicles 6 may be positioned to receive items 21 picked from any of the storage containers 106 placed within reach of the robotic picking arms 11 (i.e. item pickers). Each of the robotic picking arms are arranged to pick items from a storage container 106 placed under the robotic picker arm and transfer them to a consolidation vehicle 6. In case of fulfilling an order comprising multiple items, the multiple items are transferred to the same consolidation vehicle 6.

When all items in an order have been transferred to the consolidation vehicle, the consolidation vehicle is moved upon the transfer rail grid to an item delivery station for further processing of the order. The item delivery station features a second section 10 of the transfer rail grid 5, upon which section the consolidation vehicle 6 may be positioned to deliver items of an order received from the storage container(s) to a packaging/processing assembly 12. Thus, the combination of the consolidation vehicles 6 and the transfer rail grid 5 provides a highly flexible positioning of the item delivery station 8 and the packaging/processing assembly 12.

In the exemplary storage system shown in FIGS. 4-7, the items 21 may be delivered to the packaging/processing assembly 12 via a belt conveyor 20 or an opening 19. The preferred manner in which the items are delivered to the packaging/processing assembly 12 may depend on the layout of the storage system and the available space in the building housing the storage system.

Figure 6:
FIG. 6 is a perspective view of an item delivery station of the storage system in FIG. 3.
Figure 7:
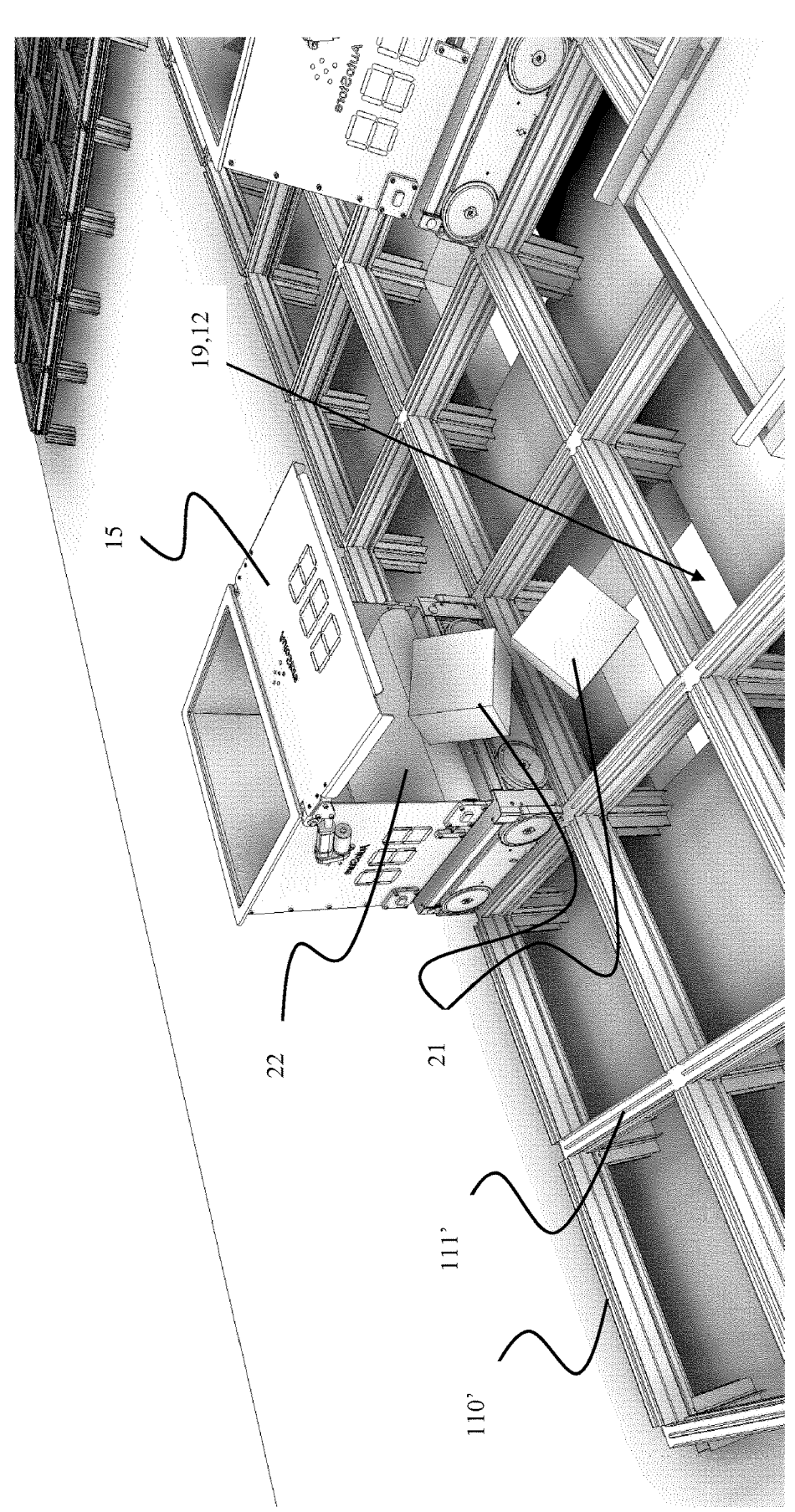
FIG. 7 is a detailed view of the item delivery station in FIG. 5.
Figure 8:
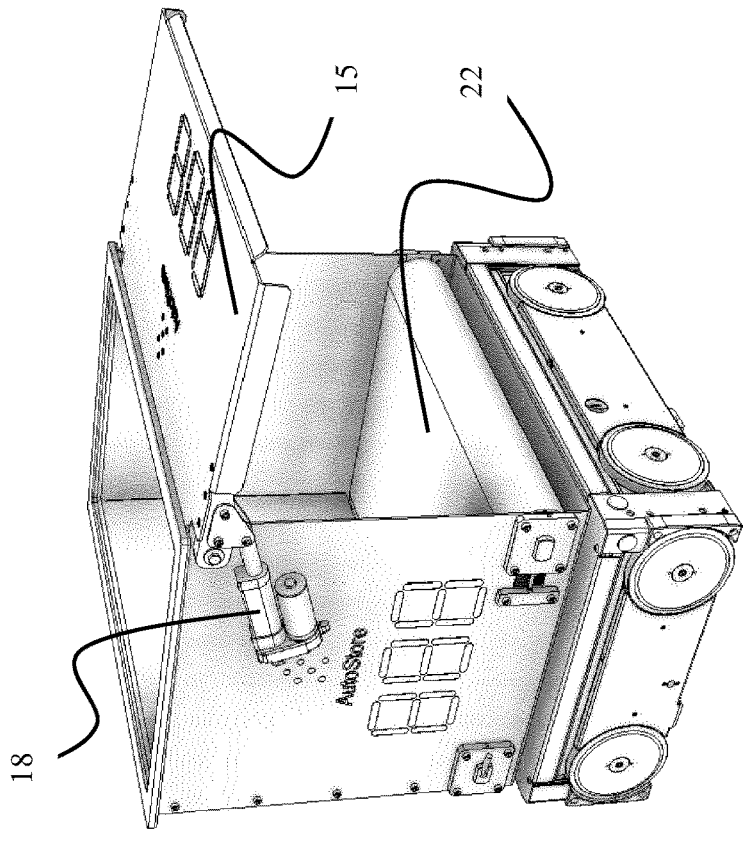
FIG. 8 are perspective views of the consolidation vehicle used in the storage system in FIG. 3.
Figure 8:
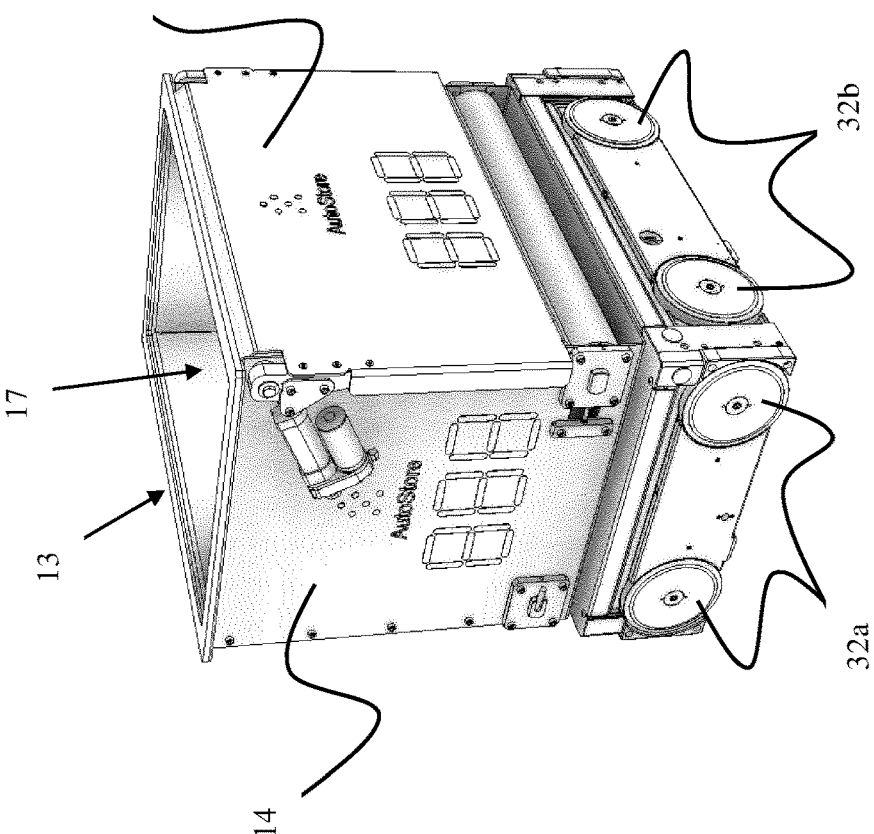

A detailed view of an exemplary consolidation vehicle 6 used in the storage system in FIGS. 4-7 is shown in FIG. 8. The consolidation vehicle 6 comprises an item carrier 13 having an open top 17, four sidewalls 14,15 (i.e. a peripheral sidewall) and a conveyor belt 22 (i.e. a laterally moveable surface and/or an item transfer assembly) arranged at a bottom section of the item carrier. One of the sidewalls 15 are hinged at an upper section of the item carrier 13 and connected to actuators 18, such that the sidewall may be moved between an open and a closed position. As illustrated in FIGS. 6 and 7, items 21 arranged in the item carrier 13 may be emptied out when the conveyor belt 22 is activated and the openable sidewall 15 is in the open position.

The consolidation vehicles 6 features a motorized wheel arrangement 32a,32b allowing the vehicle to move in two perpendicular directions upon the transfer grid 5. The wheel arrangement is similar to the wheel arrangement of the prior art container handling vehicles 200,300 as disclosed in e.g. NO 317366 B1 and WO 2015/193278 A1 and may optionally be motorized by use of hub motors as disclosed in WO 2016/120075 A1.

The transfer rail grid is made up of dual-track rails 110', 111', and the consolidation vehicles 6 have a horizontal periphery fitting within a horizontal area defined by a grid cell 122' of the transfer rail grid 5. This solution is highly efficient since two consolidation vehicles 6 may pass each other on any adjacent grid cells 122' of the transfer rail grid 5, i.e. requiring minimal deviation from the shortest pathway between two position son the transfer grid. Further, multiple consolidation vehicles 6 may be arranged at adjacent grid cells at the item picking area, such that the robotic picker arm may reach multiple consolidation vehicles by moving a shortest possible distance between a consolidation vehicle and a storage container. The latter provides a very time efficient picking process.

Depending on the type of container handling vehicle 200,300 being used on the storage grid structure, the top rail grid 108 may be identical or different from the transfer rail grid 5. The top rail grid may for instance be different from the transfer rail grid by featuring a first set of rails being single track rails and a second set of rails being double track rails, as described in the background section. However, independent of whether the top rail grid is identical to the transfer rail grid or not, the rail grids are arranged separate from each other such that the container handling vehicles 300 are prevented from entering the transfer rail grid 5 and the consolidation vehicles 6 are prevented from entering the top rail grid 108. In the exemplary storage system in FIGS. 4-7, the transfer rail grid 5 is separate from the top rail grid 108 by being arranged at a different level. Having the rail grids separate is highly advantageous of several reasons. A first advantage of having the rail grids 5,108 separate is that the consolidation operations performed on the transfer rail grid may be stopped without affecting the operations performed upon the storage grid 104 not related to the consolidation operations, such as retrieving storage containers and transporting them to manually operated picking/supply stations (not shown). This ensures that the storage system has a minimum of downtime. It is noted that in case the container handling vehicles 200,300 had access to the transfer rail grid, the whole storage system would have had to be shut down in order to perform e.g. service on equipment arranged on the transfer rail grid. A second advantage is that the control system may be simplified since the consolidation vehicles may be controlled and moved without having to take the movement of the container handling vehicles into consideration.

In other embodiments of the storage system, the transfer rail grid and the top rail grid may be at the same level but separate by having blocking elements, e.g. a fence, arranged between the two grids or by being arranged at a distance from each other.

Figure 9:
FIG. 9 is a topside perspective view of an exemplary consolidation vehicle arranged at an item delivery station.
Figure 10:
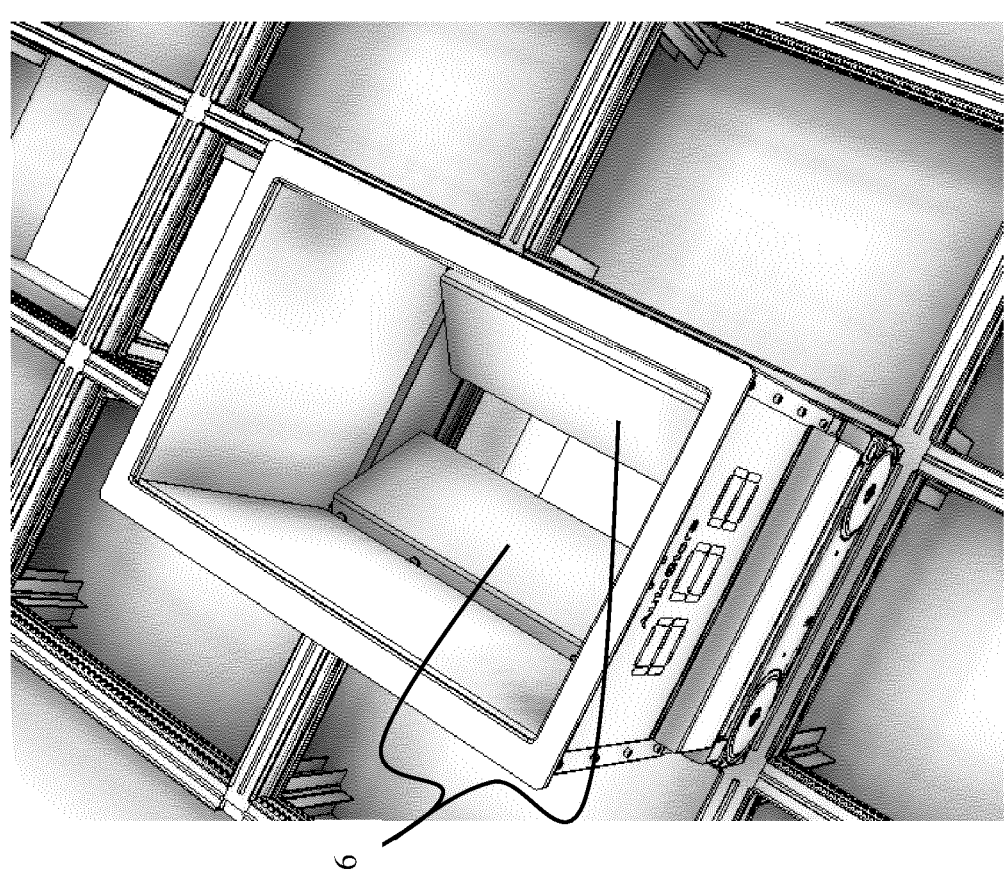
FIG. 10 are topside perspective views of the consolidation vehicle in FIG. 8 during emptying of items at the item delivery station.
Figure 10:
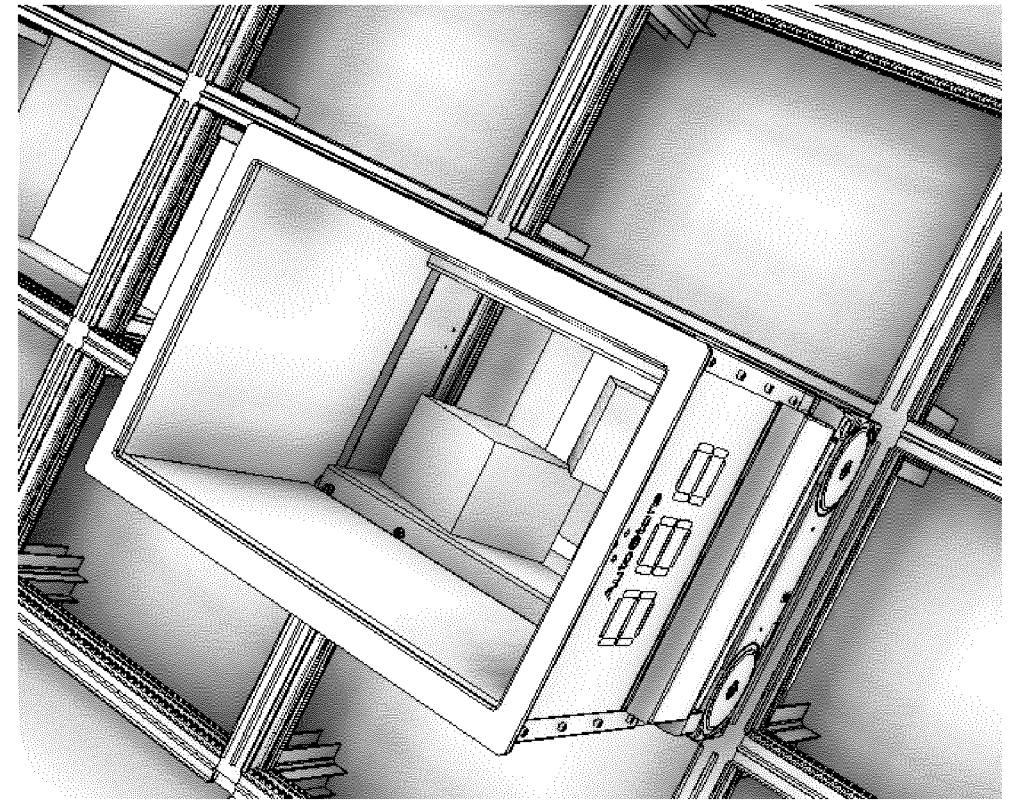
Figure 11:
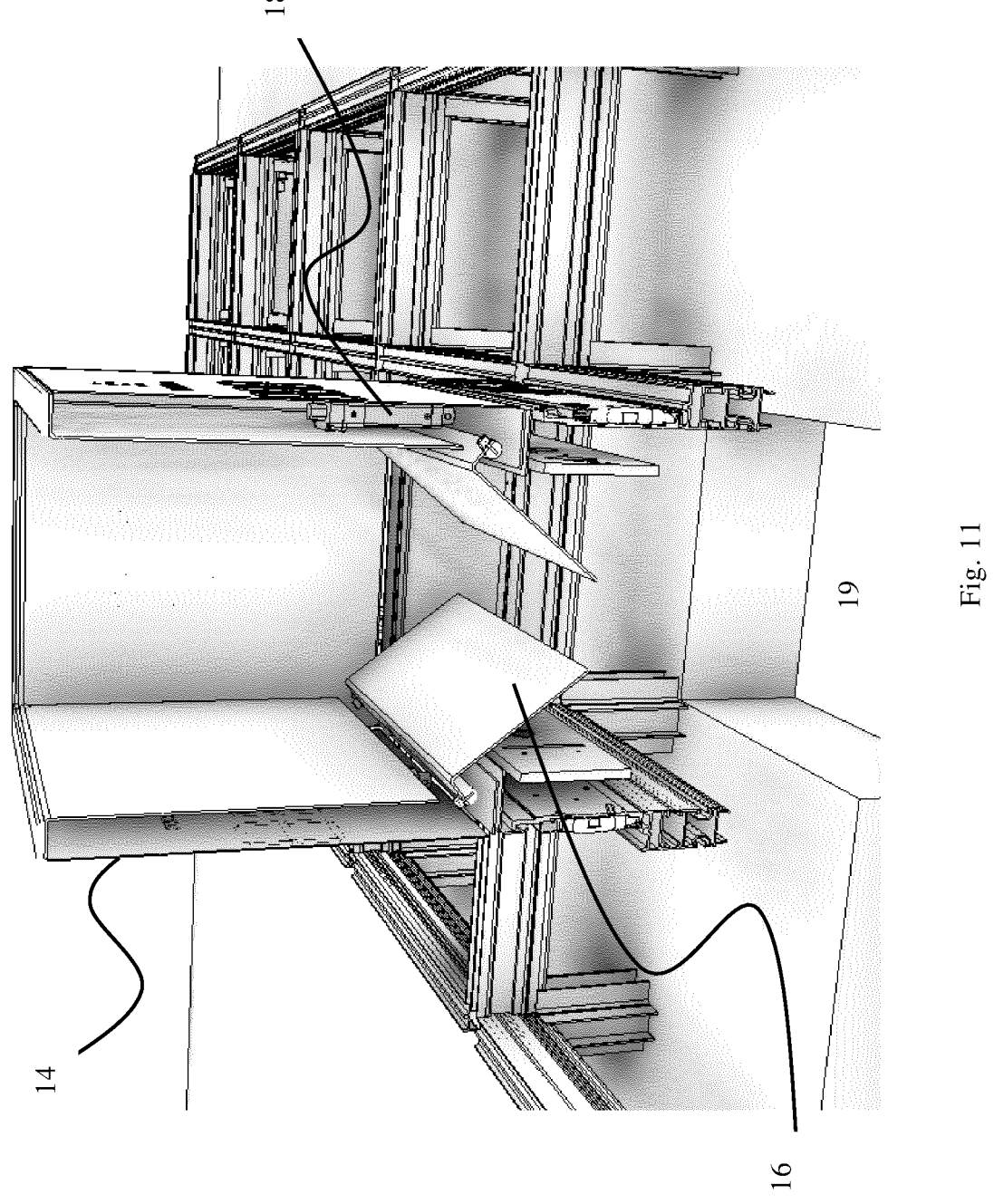
FIG. 11 is a perspective cross-sectional view of the consolidation vehicle in FIGS. 8 and 9.

A second exemplary embodiment of a consolidation vehicle 6' is shown in FIGS. 9-11. The consolidation vehicle 6' features a wheel arrangement 32a,32b allowing the vehicle to move in two perpendicular directions upon the transfer grid 5 and comprises an item carrier 13 having an open top 17, four sidewalls 14,15 (i.e. a peripheral sidewall) and an openable bottom section 16 (i.e. an item transfer assembly). The bottom section 16 is connected to an actuator 18 arranged to move the bottom section between a closed position, see FIG. 9, and an open position, see FIGS. 10 and 11. To allow room for the openable bottom section, the wheel arrangement is motorized by a hub motor in each wheel.

In use, the consolidation vehicle 6' may first be arranged at an item picking area to receive items to be consolidated, then moved to an item delivery station at a position above an opening 19 for delivery of the items to a packaging/processing assembly 12 by opening the bottom section 16. Although not shown, the opening 19 may in some instances be arranged above a conveyor for further transport of the items 21 to the packaging/processing assembly 12.

Figure 15:
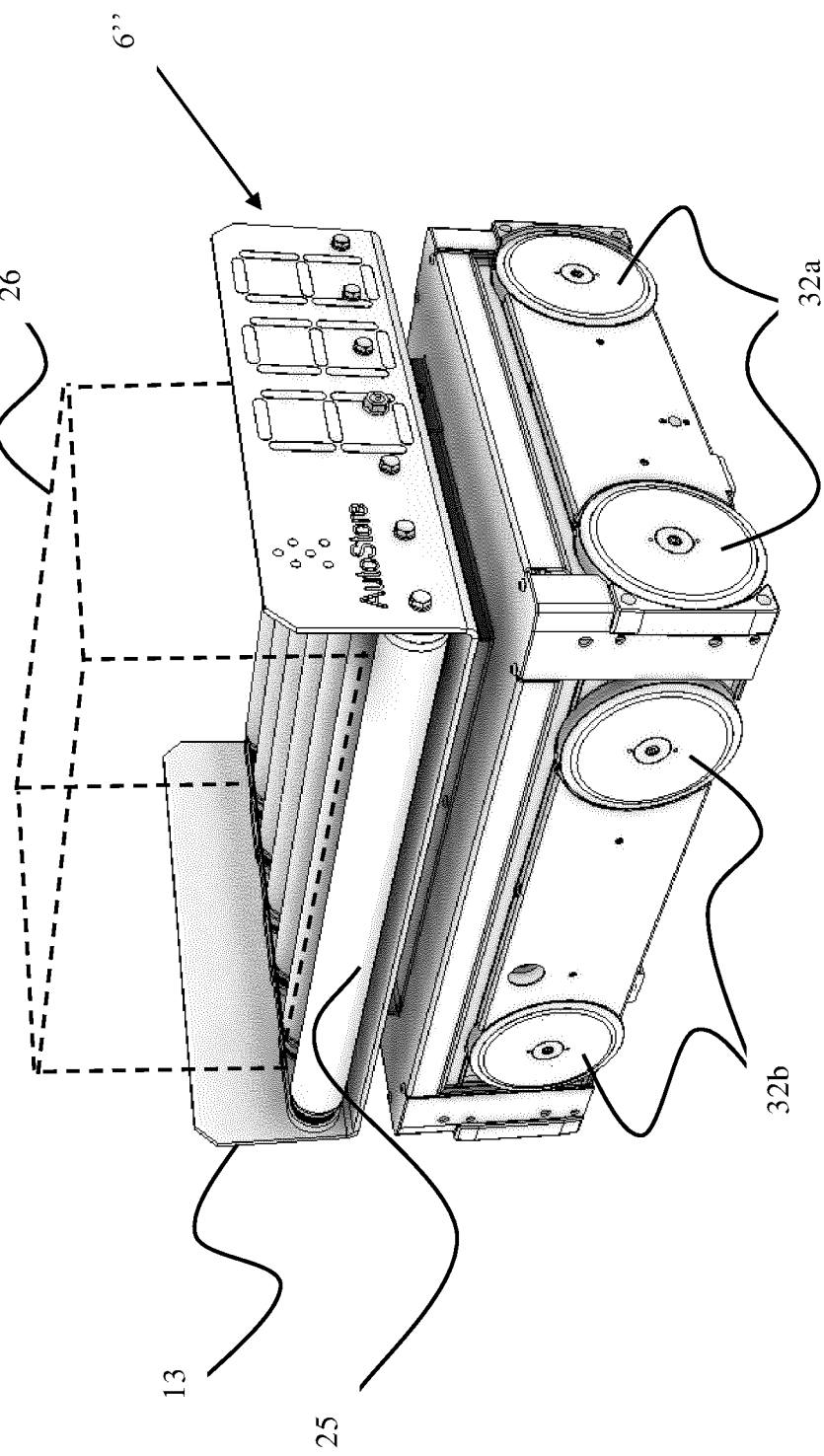
FIG. 15 is a perspective view of an exemplary consolidation vehicle.

A third exemplary embodiment of a consolidation vehicle 6" is shown in FIG. 15. The consolidation vehicle 6" features a wheel arrangement 32a,32b allowing the vehicle to move in two perpendicular directions upon the transfer grid 5 and comprises an item carrier 13 comprising a roller conveyor

25 (i.e. an item transfer assembly) arranged at a bottom section of the vehicle. The consolidation vehicle 6" is particularly suitable for direct consolidation of items in e.g. an open top packaging box 26 (schematically depicted in a dotted line) arranged upon the item carrier 13 but is also suitable for transfer of large items to be consolidated at the packaging/processing assembly 12. In use, the packaging box or large item may be transferred from the consolidation vehicle to a conveyor 20 at an item delivery station 8 by actuating the roller conveyor 25.

A consolidation operation performed by the exemplary storage system in FIGS. 4-7 may comprise the steps of positioning a consolidation vehicle 6,6' at the first section 9 of the transfer rail grid 5; transferring a first item 21 from a first storage container 106 to the item carrier 13 of the consolidation vehicle 6,6' by use of the robotic picking arm; transferring a second item 21 from the first storage container 106, or from a second storage container 106, to the item carrier 13 of the consolidation vehicle 6,6' by use of the robotic picking arm; moving the consolidation vehicle 6,6' to the second section 10 of the transfer rail grid 5; and opening the openable sidewall 15 or the bottom section 16 (i.e. opening an openable section of the item carrier), such that the first and second items 21 are emptied from the item carrier 13 in a lateral or downwards direction. When emptied out of the item carrier, the items may be transferred to a conveying arrangement, such as a conveyor belt or roller.

In an alternative consolidation operation, the consolidation of items may also be performed at the packaging/processing assembly 12. For instance, by transferring a first item to a first consolidation vehicle 6,6' and a second item to a second consolidation vehicle 6,6'. The first and the second consolidation vehicle may then be moved to empty the first and second item, respectively, at the same item delivery station 8, such that the items are consolidated at the item delivery station 8 or the packaging/processing assembly 12. The alternative consolidation process may involve multiple consolidation vehicles, each used to transfer at least one item.

Figure 12:
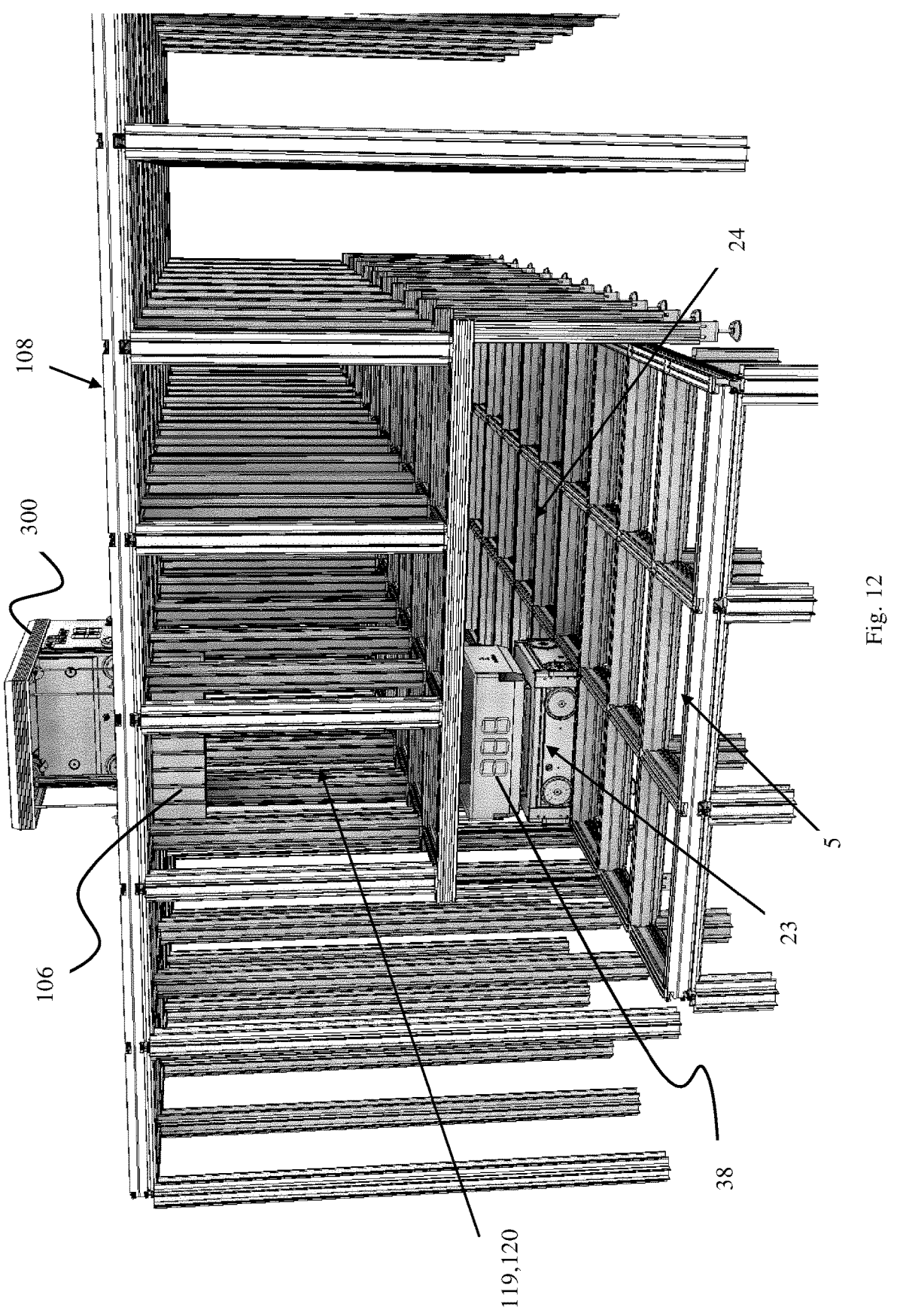
FIG. 12 is a perspective view of a storage grid featuring a container transfer vehicle arranged on a transfer grid to receive a storage container from a container handling vehicle.
Figure 13:
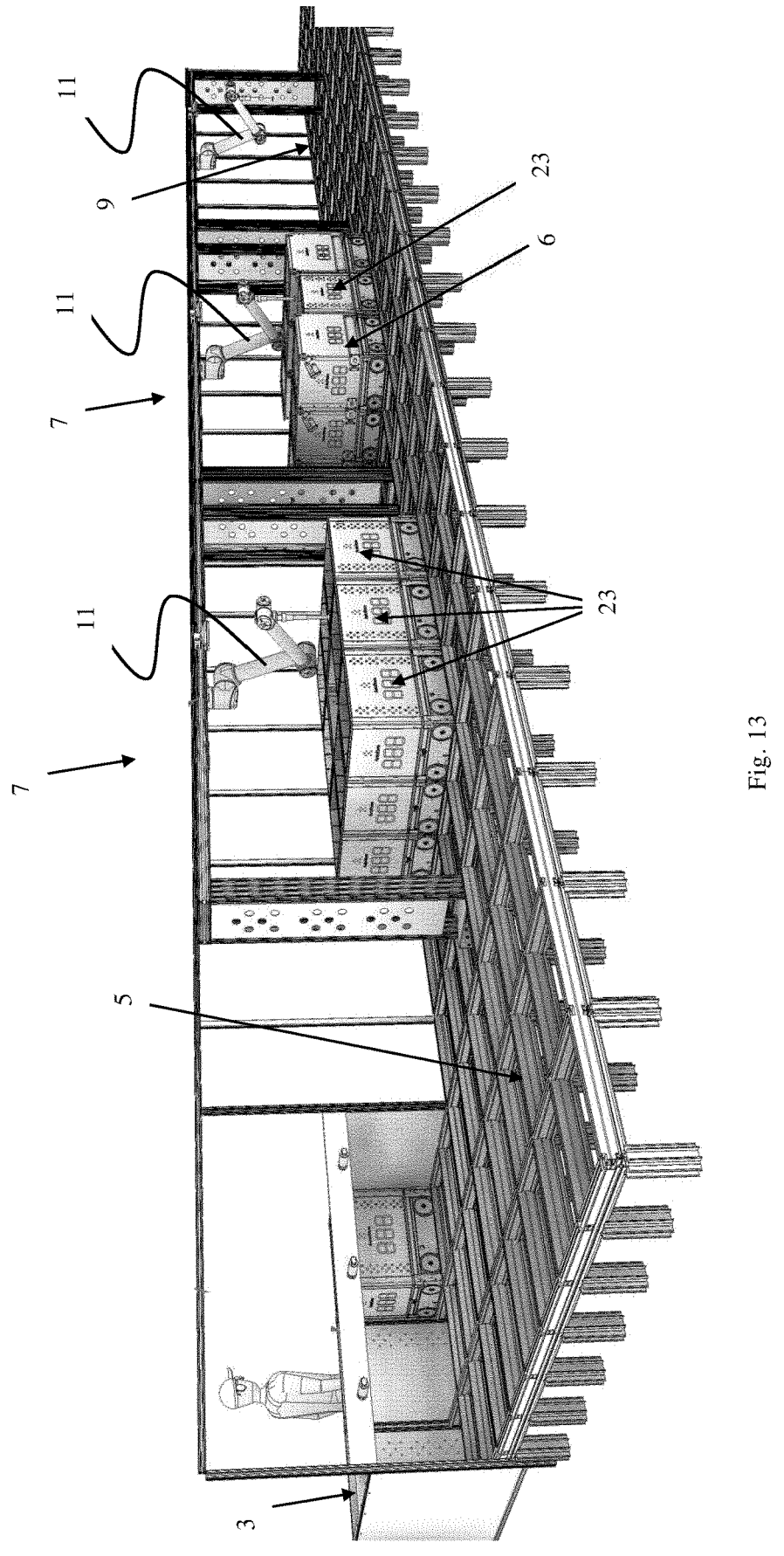
FIG. 13 is a perspective view of a second exemplary storage system according to the invention.
Figure 14:
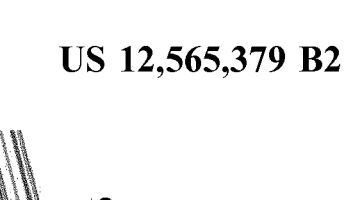
FIG. 14 is a perspective view of a picking station of the storage system in FIG. 12.

A second exemplary embodiment of a storage system is shown in FIGS. 12-14. In the second exemplary embodiment, a storage container 106 accommodating items 21 to be picked is first transferred from the storage grid 104 to a container transfer vehicle 23 arranged on a third section 24 of the transfer rail grid 5 by use of a container handling vehicle 300. The third section 24 of the transfer rail grid 5 extend below a transfer column of the storage grid 104 and is connected to the first section 9 of the transfer rail grid such that the container transfer vehicle may move a storage container to an item picking area. The second exemplary embodiment of a storage system comprises an item delivery station 8 (not shown) as described for the storage system in FIGS. 4-7 having a second section 10 of the transfer rail grid 5 connected to the first section 9 of the transfer rail grid 5 to allow movement of the consolidation vehicle from the item picking area 7 to the item delivery station 8.

The container transfer vehicle features a wheel arrangement 32a,32b allowing the vehicle to move in two perpendicular directions upon the transfer rail grid 5 and comprises a storage container carrier 38 for receiving a storage container lowered through a transfer column by a container handling vehicle 300. In the exemplary container transfer vehicle 23, the container carrier 38 features an open top 17 and four sidewalls 14. However, alternative container carriers are envisioned. The requirements of a container carrier are that it may keep a storage container in a stable position upon the container transfer vehicle during movement upon the grid and that the container carrier may receive a storage container from above and provide topside access to items within the storage container. Like the consolidation vehicles 6, the container transfer vehicle 23 has a maximum horizontal periphery fitting within a horizontal area defined by a grid cell 122' of the transfer rail grid 5. This allows for a compact arrangement of multiple adjacent container transfer vehicles 23 and consolidation vehicles 6 at the item picking area 7. The compact arrangement ensures that the distance which a robotic picking arm 11 must move to pick items from the storage containers arranged on the container transfer vehicles 23 and transfer them to a consolidation vehicle 6 is as short as possible. By having the storage containers moved to the item picking area by use of the container transfer vehicles, a more flexible positioning of the item picking area is obtained compared to the storage system in FIGS. 4-7.

A consolidation operation performed by the exemplary storage system in FIGS. 12-14 may comprise the steps described above for the exemplary storage system in FIGS. 4-7, preceded by the steps of retrieving a first storage container 106 having a first item 21 from the storage grid 104, accommodating the first storage container on a first container transfer vehicle 23 and positioning the first container transfer vehicle 23 at the first section 9 of the transfer rail grid 5, and optionally retrieving a second storage container 106 having a second item 21 from the storage grid 104 and accommodating the second storage container on a second container transfer vehicle 23 and positioning the second container transfer vehicle 23 at the first section 9 of the transfer rail grid 5.

In addition to the item picking area 7, wherein items may be picked by an automatic robotic picking arm 11, the exemplary storage system in FIGS. 12-14 also features a manual picking/stocking station for handling items unsuitable for picking by the robotic picking arm 11. In case an order to be consolidated comprises such unsuitable item, a consolidation vehicle 6,6',6" may be positioned at the manual picking/stocking station to receive the item from an operator, for instance before moving to a delivery station 8 or to an item picking area 7 to receive further items to be consolidated.

The exemplary storage systems feature a single storage grid structure 104. However, the present invention is also highly advantageous in similar storage systems featuring at least two separate storage grid structures. In such storage systems, items stored in different storage grid structures may easily be consolidated. For instance, with reference to the consolidation operation described above, the first storage container may be retrieved from a first storage grid structure, while the second storage container is retrieved from a second storage grid structure.

In further embodiments of the inventive storage system, the transfer rail grid is arranged such that packages/items from at least one prior art or third-party storage system may be transferred onto a consolidation vehicle for consolidation and/or packaging/processing at the packaging/processing assembly 12.

REFERENCE NUMERALS

1 Storage system
2 Transfer section
3 Manual picking/stocking station
5 Transfer rail grid
6 Consolidation vehicle
7 Item picking area 8 Item delivery station
9 First section (of the transfer rail grid)
10 Second section (of the transfer rail grid)
11 Item picker, robotic arm
12 Packaging/processing assembly
13 Item carrier
14 Sidewall
15 Openable sidewall, cover
16 Bottom section
17 Open top
18 Actuator
19 Hatchway
20 Conveyor belt (at an item delivery station)
21 Item (suitable for storage in a storage container)
22 Conveyor belt (at bottom of consolidation vehicle)
23 Container transfer vehicle
24 Third section (of the transfer grid)
25 Roller conveyor
26 Packaging box
30 Guiding pin
31 Lifting band
32a,32b Wheel arrangement (of container handling vehicle)
32'a,32'b Wheel arrangement (of consolidation vehicle)
33 Lifting frame
34 Lifting device
35 Container connecting element
38 Storage container carrier
100 Framework structure
102 Upright members of framework structure, i.e. vertical column profiles
103 Horizontal members of framework structure
104 Storage grid, storage grid structure
105 Storage column
106 Storage container
107 Stack
108 Top rail grid, rail system
110 First set of parallel rails in first direction (X), top rails
111 Second set of parallel rails in second direction (Y), top rails
110' Transfer rails, in a first direction of a transfer rail grid
111' Transfer rails, in a second direction, perpendicular to the first direction, of a transfer rail grid
112 Grid column
115 Grid opening
119 Transfer column,
120 Transfer column
122 Grid cell (top rail grid)
122' Grid cell (of transfer rail grid)
200 Prior art container handling vehicle
300 Prior art container handling vehicle
X First direction
Y Second direction
Z Third direction

The invention claimed is:

1. A storage system comprising:

a storage grid structure, in which storage containers are stored;

multiple container handling vehicles;

wherein the storage grid structure comprises vertical column profiles interconnected at their upper ends by top rails forming a horizontal top rail grid upon which the container handling vehicles may move in two perpendicular directions;

wherein the container handling vehicles are able to retrieve storage containers from, and store storage containers in, the storage grid structure, and transport the storage containers on the top rail grid;

at least one consolidation vehicle;

a transfer rail grid;

an item picking area; and an item delivery station;

wherein:

the top rail grid is separate from the transfer rail grid;

the consolidation vehicle comprises a wheel arrangement for moving the consolidation vehicle in two perpendicular directions upon the transfer rail grid;

the transfer rail grid comprises transfer rails upon which the consolidation vehicle may move in two perpendicular horizontal directions;

the item picking area comprises a first section of the transfer rail grid, upon which the consolidation vehicle may be positioned to receive multiple items picked from at least one storage container, and an item picker arranged to pick the items from the storage container and transfer the items to the consolidation vehicle;

the item delivery station comprises a second section of the transfer rail grid, upon which the consolidation vehicle may be positioned to deliver items received from the storage container to a packaging/processing assembly; and the consolidation vehicle comprises an item carrier arranged such that items may be emptied from the item carrier when the consolidation vehicle is positioned at the item delivery station.

2. The storage system according to claim 1, wherein the transfer rail grid is arranged at a lower level than the level of the top rail grid.

3. The storage system according to claim 1, wherein items may be emptied from the item carrier in a lateral or downwards direction, when the consolidation vehicle is positioned at the item delivery station.

4. The storage system according to claim 1, wherein the item picker comprises a robotic picking arm.

5. The storage system according to claim 1, wherein the item delivery station comprises an opening or a conveyor arranged to guide items emptied from the consolidation vehicle to the packaging/processing assembly.

6. The storage system according to claim 1, wherein the transfer rails are dual-track rails, such that two consolidation vehicles may pass each other on adjacent grid cells of the transfer rail grid.

7. The storage system according to claim 1, wherein the consolidation vehicle has a horizontal periphery fitting within the horizontal area defined by a grid cell of the transfer rail grid.

8. The storage system according to claim 1, wherein the item carrier has an open top and comprises an openable section arranged such that items may be emptied from the item carrier when the openable section is open.

9. The storage system according to claim 8, wherein the item carrier comprises a peripheral sidewall and a bottom section, and the openable section comprises a section of the peripheral sidewall or the bottom section.

10. The storage system according to claim 9, wherein the consolidation vehicle comprises an actuator connected to the openable section of the peripheral sidewall or the bottom section, the actuator being arranged to move the section of the sidewall or the bottom section, respectively, between an open and closed position.

11. The storage system according to claim 9, wherein the openable section of the peripheral sidewall or the bottom section comprises a hinged surface.

12. The storage system according to claim 1, comprising at least one container transfer vehicle having a storage container carrier and a wheel arrangement arranged to move the container transfer vehicle in two perpendicular directions upon the transfer rail grid, and the transfer rail grid comprises a third section arranged below a transfer column of the storage grid, such that a container handling vehicle may raise or lower a storage container between the storage container carrier and the top rail grid.

13. A consolidation vehicle for a storage system comprising a storage grid structure, in which storage containers are stored;

multiple container handling vehicles;

wherein the storage grid structure comprises vertical column profiles interconnected at their upper ends by top rails forming a horizontal top rail grid upon which the container handling vehicles may move in two perpendicular directions;

wherein the container handling vehicles are able to retrieve storage containers from, and store storage containers in, the storage grid structure, and transport the storage containers on the top rail grid;

at least one consolidation vehicle;

a transfer rail grid;

an item picking area; and an item delivery station;

wherein the consolidation vehicle comprises a wheel arrangement for moving the consolidation vehicle in two perpendicular directions upon the transfer rail grid;

the transfer rail grid comprises transfer rails upon which the consolidation vehicle may move in two perpendicular horizontal directions;

the item picking area comprises a first section of the transfer rail grid, upon which the consolidation vehicle may be positioned to receive multiple items picked from at least one storage container, and an item picker arranged to pick the items from the storage container and transfer the items to the consolidation vehicle;

the item delivery station comprises a second section of the transfer rail grid, upon which the consolidation vehicle may be positioned to deliver items received from the storage container to a packaging/processing assembly; and the consolidation vehicle comprises an item carrier arranged such that items may be emptied from the item carrier when the consolidation vehicle is positioned at the item delivery station, the consolidation vehicle comprising a wheel arrangement and an item carrier, wherein the wheel arrangement is for moving the consolidation vehicle in two perpendicular directions upon a transfer rail grid; and wherein the item carrier comprises a peripheral sidewall, a bottom section and an open top, wherein a section of the peripheral sidewall is openable, such that an item may be emptied from the item carrier through the openable section in a lateral direction.

14. The consolidation vehicle according to claim 13, comprising an actuator connected to the openable section of the peripheral sidewall, the actuator arranged to move the openable section between an open and closed position, such that an item may be emptied from the item carrier when the openable section is in the open position.

15. The consolidation vehicle according to claim 13, comprising a laterally moveable surface, arranged to move items accommodated in the item carrier in a lateral direction towards the openable section of the peripheral sidewall, and/or an inclinable surface at the bottom section arranged such that items may slide out of the item carrier when the surface is inclined.

16. The consolidation vehicle according to claim 15, wherein the laterally moveable surface is a conveyor belt arranged at the bottom section of the item carrier.

17. A method of consolidating multiple items in a storage system, the storage system comprising a storage grid structure, in which storage containers are stored, and multiple container handling vehicles, the storage grid structure comprises vertical column profiles interconnected at their upper ends by top rails forming a horizontal top rail grid upon which the container handling vehicles may move in two perpendicular directions, the container handling vehicles are able to retrieve storage containers from, and store storage containers in, the storage grid structure, and transport the storage containers on the top rail grid, wherein the storage system comprises at least one consolidation vehicle, a transfer rail grid, an item picking area, and an item delivery station, wherein the consolidation vehicle comprises a wheel arrangement for moving the consolidation vehicle in two perpendicular directions upon the transfer rail grid;

wherein the transfer rail grid comprises transfer rails upon which the consolidation vehicle may move in two perpendicular horizontal directions;

wherein the item picking area comprises a first section of the transfer rail grid, upon which the consolidation vehicle may be positioned to receive multiple items picked from at least one storage container, and an item picker arranged to pick the items from the storage container and transfer the items to the consolidation vehicle;

wherein the item delivery station comprises a second section of the transfer rail grid, upon which the consolidation vehicle may be positioned to deliver items received from the storage container to a packaging/processing assembly; and the consolidation vehicle comprises an item carrier having an open top and comprising an openable section arranged such that the items may be emptied from the item carrier when the consolidation vehicle is positioned at the item delivery station; the method comprising:

positioning a consolidation vehicle at the first section of the transfer rail grid;

transferring a first item from a first storage container to the item carrier of the consolidation vehicle by use of the item picker;

transferring a second item from the first storage container, or from a second storage container, to the item carrier of the consolidation vehicle by use of the item picker;

moving the consolidation vehicle to the second section of the transfer rail grid; and opening the openable section, such that the first and second items are emptied from the item carrier in a lateral or downwards direction.

*     *     *     *     *